(12) United States Patent
Hu et al.

(10) Patent No.: US 11,104,601 B2
(45) Date of Patent: *Aug. 31, 2021

(54) BENDABLE ELECTRONIC DEVICE MODULES, ARTICLES AND BONDING METHODS OF MAKING THE SAME

(71) Applicant: CORNING INCORPORATED, Corning, NY (US)

(72) Inventors: Guangli Hu, Berkeley Heights, NJ (US); Dhananjay Joshi, Painted Post, NY (US); Eunyoung Park, Elmira, NY (US); Yousef Kayed Qaroush, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 16/085,759

(22) PCT Filed: Mar. 13, 2017

(86) PCT No.: PCT/US2017/022021
§ 371 (c)(1),
(2) Date: Sep. 17, 2018

(87) PCT Pub. No.: WO2017/160680
PCT Pub. Date: Sep. 21, 2017

(65) Prior Publication Data
US 2019/0047900 A1 Feb. 14, 2019

Related U.S. Application Data

(60) Provisional application No. 62/309,624, filed on Mar. 17, 2016.

(51) Int. Cl.
*C03C 3/093* (2006.01)
*B32B 17/06* (2006.01)
(Continued)

(52) U.S. Cl.
CPC .............. *C03C 3/093* (2013.01); *B32B 17/06* (2013.01); *C03C 3/085* (2013.01); *C03C 3/091* (2013.01);
(Continued)

(58) Field of Classification Search
CPC ......... C03C 3/093; C03C 3/085; C03C 3/091; C03C 17/28; B32B 17/06;
(Continued)

(56) References Cited

U.S. PATENT DOCUMENTS 6,922,276 B2  7/2005  Zhang et al.
9,321,678 B2  4/2016  Chang et al.
(Continued)

FOREIGN PATENT DOCUMENTS

CN     1760564 A     4/2006
CN     103474580 A   12/2013
(Continued)

OTHER PUBLICATIONS

English Translation of KR1020187030023 Office Action dated Jun. 25, 2020; 4 Pages; Korean Patent Office.
(Continued)

*Primary Examiner* — Ruiyun Zhang
(74) *Attorney, Agent, or Firm* — Jeffrey A. Schmidt

(57) ABSTRACT

A foldable electronic device module that includes a glass cover element having a thickness from about 25 μm to about 200 μm, an elastic modulus from about 20 GPa to about 140 GPa. The module further includes: a stack having a thickness from about 50 μm to about 600 μm; and a first adhesive joining the stack to a second primary surface of the cover element, the adhesive having a shear modulus from about 0.01 MPa to about 1 GPa and a glass transition temperature of at least 80 C. Further, the device module includes a flex-bond residual stress region through the thickness, and
(Continued)

within a central region, of the cover element that ranges from a maximum compressive residual stress at the second primary surface to a maximum tensile residual stress at a first primary surface of the element along a central bend axis of the cover element.

22 Claims, 12 Drawing Sheets

(51) Int. Cl.
*C03C 17/28* (2006.01)
*G06F 1/16* (2006.01)
*H04M 1/02* (2006.01)
*C03C 3/085* (2006.01)
*C03C 3/091* (2006.01)

(52) U.S. Cl.
CPC ............ *C03C 17/28* (2013.01); *G06F 1/1652* (2013.01); *H04M 1/0268* (2013.01); *C09K 2323/05* (2020.08); *C09K 2323/06* (2020.08)

(58) Field of Classification Search
CPC ......... B32B 17/10137; B32B 17/10018; G06F 1/1652; H04M 1/0268; Y10T 428/1086; Y10T 428/1095; C09K 2323/05; C09K 2323/06
USPC ................... 428/1.6, 1.62; 362/382; 156/60; 52/796.1
See application file for complete search history.

(56) References Cited

U.S. PATENT DOCUMENTS

| | | | |
|---|---|---|---|
| 9,857,844 | B2 | 1/2018 | Tsukamoto |
| 2006/0098153 | A1 | 5/2006 | Slikkerveer, I et al. |
| 2009/0201443 | A1 | 8/2009 | Sasaki et al. |
| 2011/0154861 | A1 | 6/2011 | Kishimoto et al. |
| 2012/0280368 | A1 | 11/2012 | Garner et al. |
| 2014/0050911 | A1 | 2/2014 | Mauro et al. |
| 2014/0253847 | A1 | 9/2014 | Saneto et al. |
| 2015/0210588 | A1 | 7/2015 | Chang et al. |
| 2015/0258750 | A1 | 9/2015 | Kang et al. |
| 2015/0364718 | A1 | 12/2015 | Huang et al. |
| 2016/0009068 | A1 | 1/2016 | Garner |
| 2018/0315953 | A1 | 11/2018 | Hu et al. |

FOREIGN PATENT DOCUMENTS

| | | |
|---|---|---|
| CN | 103897620 A | 7/2014 |
| CN | 104241316 A | 12/2014 |
| CN | 104425632 A | 3/2015 |
| CN | 104680941 A | 6/2015 |
| CN | 108351547 A | 7/2018 |
| DE | 102009021938 A1 | 11/2010 |
| EP | 131409 A1 | 8/2000 |
| EP | 2236281 A1 | 10/2010 |
| FR | 2750075 A1 | 12/1997 |
| GB | 20035899 B | 10/1982 |
| GN | 101386776 A | 3/2009 |
| JP | 2006-507528 A | 3/2006 |
| JP | 2010145731 A | 7/2010 |
| JP | 2011-047976 A | 3/2011 |
| JP | 2015-043078 A | 3/2015 |
| KR | 2012016906 A | 2/2012 |
| KR | 2014007252 A | 1/2014 |
| TW | 201043471 A | 12/2010 |
| TW | 201532981 A | 9/2015 |
| TW | 201539280 A | 10/2015 |
| TW | 201544330 A | 12/2015 |
| WO | 2012166343 A2 | 12/2012 |
| WO | 2014133923 A2 | 12/2012 |
| WO | 2015011600 A1 | 1/2015 |
| WO | 2015/056487 A1 | 4/2015 |
| WO | 2017066364 A1 | 4/2017 |

OTHER PUBLICATIONS

"Ahead of the Curve: Samsung, LG Debut Flexible Displays"; IHS Electronics360; 3 Pages; 2014.

Aben et al; "Modern Photoelasticity for Residual Stress Measurement in Glass"; Glasstress LTD; Full Paper; 8 Pages; Date Unknown.

European Patent Application No. 17715556.1 Office Action dated Oct. 24, 2018; 7 Pages; European Patent Office.

International Search Report and Written Opinion of the International Searching Authority; PCT/US2017/022021; dated Jun. 16, 2017; 11 Pages; European Patent Office.

Kwon et al; "Mechanically and Optically Reliable Folding Structure With a Hyperelastic Material for Seamless Foldable Displays"; Applied Physics Letters, 98, (2011); pp. 151904-1-151904-3.

Taiwanese Patent Application No. 106108492, Search Report dated Sep. 17, 2020, 1 Page (English Translation Only); Taiwanese Patent Office.

Chinese Patent Application No. 201780018026.0, Office Action dated Nov. 26, 2020, 5 pages (English Translation Only); Chinese Patent Office.

Japanese Patent Application No. 2018-548403, Office Action dated Dec. 22, 2020, 6 pages (3 pages of English Translation and 3 pages of Original Document); Japanese Patent Office.

Taiwanese Patent Application No. 106108492, Office Action dated Apr. 22, 2021, 4 page (English Translation Only) Taiwanese Patent Office.

BENDABLE ELECTRONIC DEVICE MODULES, ARTICLES AND BONDING METHODS OF MAKING THE SAME

CROSS-REFERENCE TO RELATED APPLICATIONS

This application claims the benefit of priority under 35 U.S.C. § 371 of International Patent Application Serial No. PCT/US2017/022021, filed on Mar. 13, 2017, which in turn, claims the benefit of priority of U.S. Provisional Patent Application Ser. No. 62/309,624 filed on Mar. 17, 2016, the contents of each of which are relied upon and incorporated herein by reference in their entireties.

TECHNICAL FIELD

The disclosure generally relates to bendable electronic device modules, articles and bonding methods of making them. More particularly, the disclosure relates to bendable electronic device modules having a glass-containing cover for foldable display device applications and bonding processes for making them.

BACKGROUND

Flexible versions of products and components that are traditionally rigid in nature are being conceptualized for new applications. For example, flexible electronic devices can provide thin, lightweight and flexible properties that offer opportunities for new applications including curved displays and wearable devices. Many of these flexible electronic devices incorporate flexible substrates for holding and mounting the electronic components of these devices. Metal foils have some advantages including thermal stability and chemical resistance, but suffer from high cost and a lack of optical transparency. Polymeric foils have some advantages including low cost and impact resistance, but may suffer from marginal optical transparency, lack of thermal stability, limited hermeticity and/or cyclic fatigue performance.

Some of these electronic devices also can make use of flexible displays. Optical transparency and thermal stability are often important properties for flexible display applications. In addition, flexible displays should have high fatigue and puncture resistance, including resistance to failure at small bend radii, particularly for flexible displays that have touch screen functionality and/or can be folded. Further, flexible displays should be easy to bend and fold by the consumer, depending on the intended application for the display.

Some flexible glass and glass-containing materials offer many of the desired properties for flexible and foldable substrate and display applications. However, efforts to harness glass materials for these applications have been largely unsuccessful to date. Generally, glass substrates can be manufactured to very low thickness levels (<25 µm) to achieve smaller and smaller bend radii. These "thin" glass substrates can suffer from limited puncture resistance. At the same time, thicker glass substrates (>150 µm) can be fabricated with better puncture resistance, but these substrates can lack suitable fatigue resistance and mechanical reliability upon bending.

Further, as these flexible glass materials are employed as cover elements in modules that also contain electronic components (e.g., thin film transistors ("TFTs"), touch sensors, etc.), additional layers (e.g., polymeric electronic device panels) and adhesives (e.g., epoxies, optically clear adhesives ("OCAs")), interactions between these various components and elements can lead to increasingly complex stress states that exist during use of the module within an end product, e.g., an electronic display device. These complex stress states can lead to increased stress concentration factors and/or increased stress levels (e.g., high tensile stresses) experienced by the cover elements. As such, these cover elements can be susceptible to cohesive and/or delamination failure modes within the module. Further, these complex interactions can lead to increased bending forces required to bend and fold the cover element by the consumer.

Thus, there is a need for flexible, glass-containing materials and module designs that employ these materials for use in various electronic device applications, particularly for flexible electronic display device applications, and more particularly for foldable display device applications. Further, there is also a need for module-level processing approaches to impart these module designs with added reliability and/or increased bending capability.

SUMMARY

According to a first aspect of the disclosure, a foldable electronic device module is provided that includes a glass cover element having a thickness from about 25 µm to about 200 µm and a cover element elastic modulus from about 20 GPa to about 140 GPa. The cover element has a first primary surface, and a second primary surface. The module further includes: a stack having a thickness from about 50 µm to about 600 µm; and a first adhesive joining the stack to the second primary surface of the cover element, the first adhesive having a shear modulus from about 0.01 MPa to about 1 GPa and a glass transition temperature of at least 80° C. The stack further includes a panel having first and second primary surfaces, and a panel elastic modulus from about 300 MPa to about 10 GPa. Further, the device module comprises a tangential stress at the second primary surface of the cover element of no greater than about 800 MPa in tension upon bending the module in a two-point configuration to a bend radius from about 20 mm to about 2 mm, for example from about 20 mm to about 3 mm, from about 20 mm to about 4 mm, from about 20 mm to about 5 mm, from about 20 mm to about 6 mm, from about 20 mm to about 7 mm, from about 20 mm to about 8 mm, from about 20 mm to about 9 mm, from about 20 mm to about 10 mm, from about 20 mm to about 11 mm, from about 20 mm to about 12 mm, from about 20 mm to about 13 mm, from about 20 mm to about 14 mm, from about 20 mm to about 15 mm, from about 20 mm to about 16 mm, from about 20 mm to about 17 mm, from about 20 mm to about 18 mm, from about 20 mm, to about 19 mm, from about 19 mm to about 2 mm, from about 18 mm to about 2 mm, from about 17 mm to about 2 mm, from about 16 mm to about 2 mm, from about 15 mm to about 2 mm, from about 14 mm to about 2 mm, from about 13 mm to about 2 mm, from about 12 mm to about 2 mm, from about 11 mm to about 2 mm, from about 10 mm to about 2 mm, from about 9 mm to about 2 mm, from about 8 mm to about 2 mm, from about 7 mm to about 2 mm, from about 6 mm to about 2 mm, from about 5 mm to about 2 mm, from about 4 mm to about 2 mm, from about 3 mm to about 2 mm, from about 19 mm to about 3 mm, from about 18 mm to about 4 mm, from about 17 mm to about 5 mm, from about 16 mm to about 6 mm, from about 15 mm to about 7 mm, from about 14 mm to about 8 mm, from about 13 mm to about 9 mm, from about 12 mm to about 10 mm, such that the first primary surface is in compression and the bend radius is measured from a center point above the first primary surface of the cover element to the second primary surface of the panel.

According to a second aspect of the disclosure, a foldable electronic device module is provided that includes a glass cover element having a thickness from about 25 μm to about 200 μm and a cover element elastic modulus from about 20 GPa to about 140 GPa. The cover element has a first primary surface, and a second primary surface. The module further includes: a stack having a thickness from about 50 μm to about 600 μm; and a first adhesive joining the stack to the second primary surface of the cover element, the first adhesive having a shear modulus from about 0.01 MPa to about 1 GPa and a glass transition temperature of at least 80° C. The stack further includes a panel having first and second primary surfaces, and a panel elastic modulus from about 300 MPa to about 10 GPa. Further, the device module comprises a tangential stress at the second primary surface of the cover element of no greater than about 1000 MPa in tension upon bending the module in a two-point configuration to a bend radius from about 20 mm to about 1 mm.

According to a third aspect of the disclosure, a foldable electronic device module is provided that includes a cover element having a thickness from about 25 μm to about 200 μm and a cover element elastic modulus from about 20 GPa to about 140 GPa. The cover element further includes a component having a glass composition, a first primary surface, and a second primary surface. The module further includes: a stack having a thickness from about 50 μm to about 600 μm; and a first adhesive joining the stack to the second primary surface of the cover element, the first adhesive characterized by a shear modulus from about 0.01 MPa to about 1 GPa and a glass transition temperature of at least 80° C. The stack further includes a panel having first and second primary surfaces, and a panel elastic modulus from about 300 MPa to about 10 GPa. Further, the device module includes a flex-bond residual stress region. In addition, the residual stress region is through the thickness, and within a central region, of the cover element and ranges from a maximum compressive residual stress at the second primary surface to a maximum tensile residual stress at the first primary surface along a central bend axis of the cover element.

In certain implementations of the foldable modules, the tangential stress at the second primary surface of the cover element is no greater than about 1000 MPa, for example, 950 MPa, 925 MPa, 900 MPa, 875 MPa, 850 MPa, 825 MPa, 800 MPa, 775 MPa, 750 MPa, 725 MPa, 700 MPa, 675 MPa, 650 MPa, 625 MPa, 600 MPa, 575 MPa, 550 MPa, 525 MPa, 500 MPa, or any amount between these tangential stress limits, upon bending the module in a two-point configuration to a bend radius from about 20 mm to about 1 mm, for example, 20 mm, 19.75 mm, 19.5 mm, 19.25 mm, 19 mm, 18.5 mm, 17.5 mm, 17 mm, 16.5 mm, 16 mm, 15.5 mm, 15 mm, 14.5 mm, 14 mm, 13.5 mm, and 13 mm, 12.5 mm, 12 mm, 11.5 mm, 11 mm, 10.5 mm, 10 mm, 9.5 mm, 9 mm, 8.5 mm, 7.5 mm, 7 mm, 6.5 mm, 6 mm, 5.5 mm, 5 mm, 4.5 mm, 4 mm, 3.5 mm, 3.25 mm, 3 mm, 2.75 mm, 2.5 mm, 2.25 mm, 2 mm, 1.75 mm, 1.5 mm, 1.25 mm, and as small as 1 mm. In certain other aspects of the foldable modules subjected to a bend radius greater than about 20 mm up to about 100 mm, the tangential stress at the second primary surface of the cover element can be substantially reduced through the flex-bonding concepts of the disclosure, as well as through other concepts outlined herein.

In some aspects of the foldable modules, the cover element is further characterized by no cohesive failures upon bending the module, in a two-point configuration, from a substantially un-bent configuration to the bend radius (i.e., a bend radius ranging from about 20 mm to about 1 mm, for example, 19.75 mm, 19.5 mm, 19.25 mm, 19 mm, 18.5 mm, 17.5 mm, 17 mm, 16.5 mm, 16 mm, 15.5 mm, 15 mm, 14.5 mm, 14 mm, 13.5 mm, and 13 mm, 12.5 mm, 12 mm, 11.5 mm, 11 mm, 10.5 mm, 10 mm, 9.5 mm, 9 mm, 8.5 mm, 7.5 mm, 7 mm, 6.5 mm, 6 mm, 5.5 mm, 5 mm, 4.5 mm, 4 mm, 3.5 mm, 3.25 mm, 3 mm, 2.75 mm, 2.5 mm, 2.25 mm, 2 mm, 1.75 mm, 1.5 mm, 1.25 mm, and 1 mm) for at least 200,000 bend cycles. In other aspects, the cover element is further characterized by no cohesive failures upon bending the module, in a two-point configuration, from a substantially un-bent configuration to the bend radius for at least 225,000 bend cycles, 250,000 bend cycles, 275,000 bend cycles and at least 300,000 bend cycles, and all bend cycle lower limits between these values.

According to other aspects of the foldable modules, the cover element is a glass element (e.g., the cover element includes a component having a glass composition) having a cover element elastic modulus from about 20 GPa to about 140 GPa, or any elastic modulus value between these limits, for example, 30 GPa, 35 GPa, 40 GPa, 45 GPa, 50 GPa, 55 GPa, 60 GPa, 65 GPa, 70 GPa, 75 GPa, 80 GPa, 85 GPa, 90 GPa, 95 GPa, 100 GPa, 105 GPa, 110 GPa, 115 GPa, 120 GPa, 125 GPa, 130 GPa, and 135 GPa. In other aspects, the cover element is a glass element having a cover element elastic modulus from about 20 GPa to about 120 GPa, from about 20 GPa to about 100 GPa, from about 20 GPa to about 80 GPa, from about 20 GPa to about 60 GPa, from about 20 GPa to about 40 GPa, from about 40 GPa to about 120 GPa, from about 40 GPa to about 100 GPa, from about 40 GPa to about 80 GPa, from about 40 GPa to about 60 GPa, from about 60 GPa to about 120 GPa, from about 60 GPa to about 100 GPa, from about 60 GPa to about 80 GPa, from about 80 GPa to about 120 GPa, from about 80 GPa to about 100 GPa, and from about 100 GPa to about 120 GPa. In certain implementations, the glass cover element is processed or otherwise configured with strength-enhancing measures that result in the development of one or more compressive stress regions in proximity to one or more primary surfaces of the cover element.

In certain aspects of the foldable modules, the first adhesive is characterized by a shear modulus from about 0.01 MPa to about 1 GPa, for example, from about 0.01 MPa to about 800 MPa, from about 0.01 MPa to about 600 MPa, from about 0.01 MPa to about 400 MPa, from about 0.01 MPa to about 200 MPa, from about 0.01 MPa to about 1 MPa, from about 1 MPa to about 800 MPa, from about 1 MPa to about 600 MPa, from about 1 MPa to about 400 MPa, from about 1 MPa to about 200 MPa, from about 200 MPa to about 800 MPa, from about 200 MPa to about 600 MPa, from about 200 MPa to about 400 MPa, from about 400 MPa to about 800 MPa, from about 400 MPa to about 600 MPa, and from about 600 MPa to about 800 MPa. According to an implementation of the first aspect of the foldable module, the first adhesive is characterized by a shear modulus of about 0.01 MPa, 0.02 MPa, 0.03 MPa, 0.04 MPa, 0.05 MPa, 0.06 MPa, 0.07 MPa, 0.08 MPa, 0.09 MPa, 0.1 MPa, 0.2 MPa, 0.3 MPa, 0.4 MPa, 0.5 MPa, 0.6 MPa, 0.7 MPa, 0.8 MPa, 0.9 MPa, 1 MPa, 5 MPa, 10 MPa, 20 MPa, 30 MPa, 40 MPa, 50 MPa, 60 MPa, 70 MPa, 80 MPa, 90 MPa, or 100 MPa, for example, or any amount between these shear modulus values. In an implementation of the second aspect of the foldable module, the first adhesive is characterized by a shear modulus of about 1 MPa, 5 MPa, 10 MPa, 20 MPa, 30 MPa, 40 MPa, 50 MPa, 60 MPa, 70 MPa, 80 MPa, 90 MPa, 100 MPa, 200 MPa, 300

MPa, 400 MPa, 500 MPa, 600 MPa, 700 MPa, 800 MPa, 900 MPa, or 1000 MPa, for example, or any amount between these shear modulus values.

According to some embodiments of the foldable modules of the disclosure, the first adhesive is characterized by a thickness from about 5 µm to about 60 µm, for example, from about 5 µm to about 50 µm, from about 5 µm to about 40 µm, from about 5 µm to about 30 µm, from about 5 µm to about 20 µm, from about 5 µm to about 15 µm, from about 5 µm to about 10 µm, from about 10 µm to about 60 µm, from about 15 µm to about 60 µm, from about 20 µm to about 60 µm, from about 30 µm to about 60 µm, from about 40 µm to about 60 µm, from about 50 µm to about 60 µm, from about 55 µm to about 60 µm, from about 10 µm to about 50 µm, from about 10 µm to about 40 µm, from about 10 µm to about 30 µm, from about 10 µm to about 20 µm, from about 10 µm to about 15 µm, from about 20 µm to about 50 µm, from about 30 µm to about 50 µm, from about 40 µm to about 50 µm, from about 20 µm to about 40 µm, and from about 20 µm to about 30 µm. Other embodiments have a first adhesive characterized by a thickness of about 5 µm, 10 µm, 15 µm, 20 µm, 25 µm, 30 µm, 35 µm, 40 µm, 45 µm, 50 µm, 55 µm, or 60 µm, for example, or any thickness between these thickness values. In one aspect, the thickness of the first adhesive is between 10 µm and about 20 µm.

According to other embodiments of the foldable modules of the disclosure, the first adhesive is characterized by a glass transition temperature of at least 80° C., at least 90° C., at least 100° C., at least 110° C., at least 120° C., at least 130° C., at least 140° C., at least 150° C., at least 160° C., at least 170° C., at least 180° C., at least 190° C., at least 200° C., at least 210° C., at least 220° C., at least 230° C., at least 240° C. or at least 250° C., for example, along with all glass transition temperature lower limits between these values. In certain aspects of the foldable electronic device modules, the glass transition temperature of the first adhesive can be selected to ensure that it experiences no significant change in shear modulus upon exposure to temperatures associated with module processing after the adhesive is cured or to temperatures within the module and operating temperatures of the foldable electronic device module within its application environment.

In some embodiments of the foldable modules in this disclosure having a flex-bond residual stress region, the maximum compressive residual stress at the second primary surface of the cover element at its central bend axis can reach up to 300 MPa, up to 275 MPa, up to 250 MPa, up to 225 MPa, up to 200 MPa, up to 175 MPa, up to 150 MPa, up to 125 MPa, up to 100 MPa, up to 75 MPa, up to 50 MPa, up to 40 MPa, up to 30 MPa, up to 20 MPa, or up to 10 MPa, for example, and all values between these maximum compressive stress levels at the second primary surface of the cover element. The flex-bond residual stress region can be characterized by a residual stress that varies through the thickness of the cover element. In certain aspects, the residual stress within the flex-bond residual stress region continuously varies in a substantially linear function through the thickness of the cover element, e.g., from the maximum compressive residual stress at the second primary surface to the maximum tensile residual stress at the first primary surface of the cover element.

According to some aspects of the foldable electronic device modules in the disclosure, the module also includes an ion-exchanged compressive stress region that extends from a second primary surface of the cover element to a selected depth. Further, the ion-exchanged compressive stress region includes a plurality of ion-exchangeable ions and a plurality of ion-exchanged ions, typically metal ions. The ion-exchanged ions can be selected so as to produce compressive stress in the compressive stress region. In certain aspects, the compressive stress region is characterized by a maximum compressive stress at the second primary surface up to as high as 2000 MPa, as high as 1750 MPa, as high as 1500 MPa, as high as 1250 MPa, as high as 1000 MPa, as high as 900 MPa, as high as 800 MPa, as high as 700 MPa, as high as 600 MPa, as high as 500 MPa, as high as 400 MPa, as high as 300 MPa, as high as 200 MPa, or as high as 100 MPa, for example, along with all maximum compressive stress levels between these amounts. Further, these compressive stress regions within the cover element are superimposed over any flex-bond residual stress region also contained within the cover element. For example, the actual maximum compressive stress at the second primary surface of the cover element can reflect the sum of the maximum compressive residual stress from the flex-bond residual stress region and the maximum compressive stress from the ion-exchanged compressive stress region.

According to a fourth aspect of the disclosure, a method of making a foldable electronic device module, including any of the foregoing foldable modules, is provided. The method includes a step of: disposing a cover element adjacent to a stack with a first adhesive therebetween to define a stacked module. The cover element is characterized by a thickness from about 25 µm to about 200 µm, a cover element elastic modulus from about 20 GPa to about 140 GPa, a glass composition and first and second primary surfaces. The stack is characterized by a thickness from about 100 µm to about 600 µm, and includes a panel having first and second primary surfaces and a panel elastic modulus between about 300 MPa and about 10 GPa. The first adhesive is characterized by a shear modulus between about 0.01 MPa and about 1 GPa and a glass transition temperature of at least 80° C. Further, the second primary surface of the cover element is adjacent to the first adhesive. The method also includes steps of: bending the stacked module to a flex radius, $R_{flex}$, to define a flexed module, wherein $R_{flex}$ is measured from above the stack (i.e., a center of curvature on a side of the stack in which the first primary surface faces) to the second primary surface of the cover element; curing the first adhesive in the flexed module at the flex radius, $R_{flex}$, to define a flex-bonded module; and returning the flex-bonded module to an un-bent configuration to define the foldable electronic device module.

In some embodiments, the method is conducted such that the foldable electronic module further includes a flex-bond residual stress region, formed after the step of returning the flex-bonded module to an un-bent configuration. The residual stress region is through the thickness, and within a central region, of the cover element and ranges from a maximum compressive residual stress at the second primary surface to a maximum tensile residual stress at the first primary surface at the central bend axis of the cover element, when measured with the electronic module in an un-bent configuration. In certain embodiments, $R_{flex}$ is selected in the bending step within a range of from about 5 mm to about 50 mm, for example, of about 5 mm to about 40 mm, of about 5 mm to about 30 mm, of about 5 mm to about 20 mm, of about 5 mm to about 10 mm, of about 10 mm to about 50 mm, of about 10 mm to about 40 mm, of about 10 mm to about 30 mm, of about 10 mm to about 20 mm, of about 20 mm to about 50 mm, of about 20 mm to about 40 mm, of about 20 mm to about 30 mm, of about 30 mm to about 50 mm, of about 30 mm to about 40 mm, or of about 40 mm to about 50 mm.

According to some further embodiments of the method, a flex-bond residual stress region is formed such that the maximum compressive residual stress at the second primary surface of the cover element at its central bend axis can reach up to 300 MPa, up to 275 MPa, up to 250 MPa, up to 225 MPa, up to 200 MPa, up to 175 MPa, up to 150 MPa, up to 125 MPa, up to 100 MPa, up to 75 MPa, up to 50 MPa, up to 40 MPa, up to 30 MPa, up to 20 MPa, or up to 10 MPa, for example, and all values between these maximum compressive stress levels at the second primary surface of the cover element. The flex-bond residual stress region can be characterized by a residual stress that varies through the thickness of the cover element. In certain aspects, the residual stress within the flex-bond residual stress region continuously varies in a substantially linear function through the thickness of the cover element, e.g., from the maximum compressive residual stress at the second primary surface to the maximum tensile residual stress at the first primary surface of the cover element.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments. Directional terms as used herein—for example, up, down, right, left, front, back, top, bottom—are made only with reference to the figures as drawn and are not intended to imply absolute orientation.

DETAILED DESCRIPTION

Figure 1:
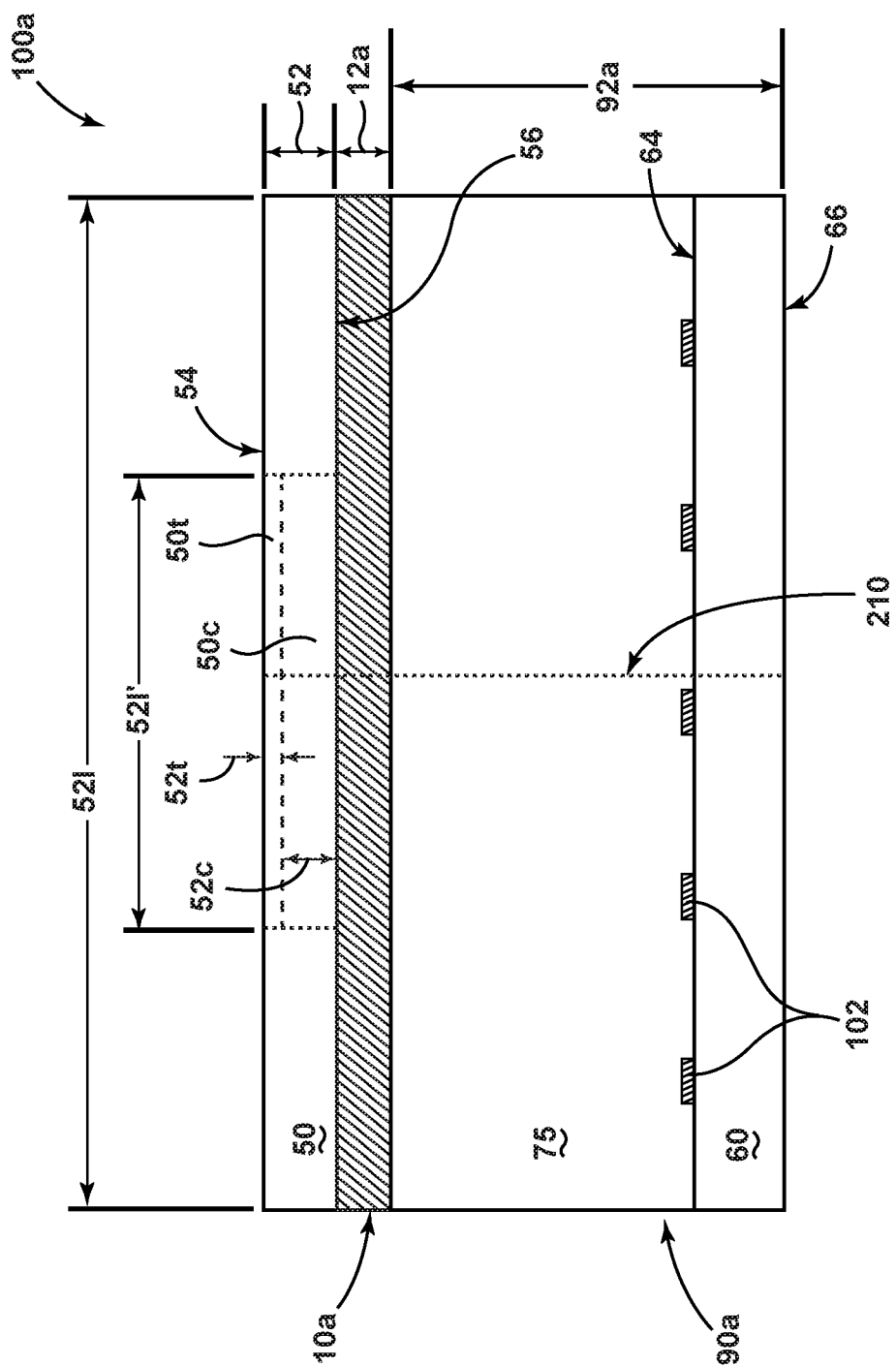
FIG. 1 is a cross-sectional view of a foldable electronic device module according to an aspect of the disclosure.

Reference will now be made in detail to embodiments, examples of which are illustrated in the accompanying drawings. Whenever possible, the same reference numerals will be used throughout the drawings to refer to the same or like parts. Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Among other features and benefits, the bendable electronic device modules and articles (and the methods of making them) of the disclosure provide mechanical reliability at small bend radii (e.g., in static tension and fatigue) as well as high puncture resistance. Configurations of these device modules and articles are also characterized by relatively low bending forces for folding or otherwise bending these device modules and articles. With regard to mechanical reliability, the bendable modules of the disclosure can be processed and otherwise configured to avoid cohesive failures in their bond to glass-containing cover elements and delamination-related failures at interfaces between the various components within the modules (e.g., adhesive-cover element interfaces). The puncture resistance capabilities and small bend radii are beneficial when the bendable modules are used in a foldable electronic device display, for example, in embodiments where one part of the display is folded over on top of another portion of the display. For example, the bendable module may be used as one or more of: a cover on the user-facing portion of a foldable electronic display device, a location in which puncture resistance is particularly beneficial; a substrate module, disposed internally within the device itself, on which electronic components are disposed; or elsewhere in a foldable electronic display device. Alternatively, the bendable modules of the disclosure may be used in a device not having a display, but one in which a glass or glass-containing layer is used for its beneficial properties and is folded or otherwise bent, in a similar manner as in a foldable display, to a tight bend radius. The puncture resistance is particularly beneficial when the bendable module is used on the exterior of the device, at a location in which a user will interact with it. Still further, the relatively low bending forces to fold or otherwise bend certain configurations of these device modules and articles is particularly beneficial to the user when these modules and articles are manually bent (e.g., within or otherwise part of a foldable, wallet-like flexible display device).

More specifically, the foldable electronic device modules in the disclosure can obtain some or all of the foregoing advantages through the development of a flex-bond residual stress region in the portion of the cover element joined to the stack with an adhesive. As an example, these foldable modules can exhibit reduced tangential stresses (e.g., in tension upon application-related bending or folding of the modules) at a primary surface of a cover element joined to a stack with an adhesive through the presence or creation of a residual stress region in the cover element with a maximum compressive stress at this primary surface. In one embodiment, the residual stress region is developed in the glass cover element by employing a flex-bonding process. In general, the cover element and stack are affixed by a first adhesive at a second primary surface of the cover element. The affixed module is then flexed to a flex radius, typically between about 5 mm to about 50 mm, the adhesive cured and then the module is returned to an un-bent configuration. The residual stress region develops as the module returns to an un-bent configuration. Further, this residual stress region, with compressive stresses at the second primary surface of the cover element (within a central region of the cover element), serves to reduce application-related tensile stresses at the second primary surface of the cover element. Consequently, the presence of the residual stress region in the cover element can translate into improved module reliability, module bend radius capability (i.e., the ability of the module to be bent to smaller radii) and/or a reduced reliance upon other approaches to develop compressive stresses at the primary surfaces of the cover element (e.g., through ion exchange-driven compressive stress region development).

The foldable electronic device modules in the disclosure can also obtain some or all of the foregoing advantages through control of the material properties and thicknesses of each of the adhesives employed within the modules. These foldable modules can also exhibit reduced tangential stresses (e.g., in tension upon application-related bending or folding of the modules) at primary surfaces of the cover element through reductions in the thicknesses of the adhesives employed in the modules and/or increases in the shear modulus of the adhesives employed between the cover element and the underlying stack. As another example, these foldable modules can exhibit reduced application-related tangential stresses at the interface between the panel and an adhesive joining the panel to the stack by reducing the shear modulus of this adhesive. These lower tensile stresses can also lead to improved module reliability, particularly in terms of resistance to delamination between the panel and the stack. In another instance, overall module stiffness (e.g., resistance to the forces applied to bend the module) can be reduced through reductions in the shear modulus of any or all of the adhesives employed in the module and/or selecting a suitable range of the thickness of any or all of the adhesives employed in the module.

Moreover, the embodiments and concepts in the disclosure provide a framework for those with ordinary skill to process and design foldable electronic device modules to reduce tangential stresses at the cover element/stack interface, reduce tangential stresses at the panel/stack interface and reduce the resistance of the module to bending, all of which can contribute to the reliability, manufacturability and suitability of these modules for use in various applications that have differing degrees and quantities of bending and folding.

Referring to FIG. 1, a foldable electronic device module 100a is depicted according to a first aspect of the disclosure that includes a cover element 50, first adhesive 10a, stack 90a, stack element 75, electronic devices 102 and panel 60. Cover element 50 has a thickness 52, a length 52 l, a width, w (not shown, but extending into the plane of the page as shown in FIG. 1), a first primary surface 54 and a second primary surface 56. Thickness 52 can range from about 25 µm to about 200 µm, for example from about 25 µm to about 175 µm, from about 25 µm to about 150 µm, from about 25 µm to about 125 µm, from about 25 µm to about 100 µm, from about 25 µm to about 75 µm, from about 25 µm to about 50 µm, from about 50 µm to about 175 µm, from about 50 µm to about 150 µm, from about 50 µm to about 125 µm, from about 50 µm to about 100 µm, from about 50 µm to about 75 µm, from about 75 µm to about 175 µm, from about 75 µm to about 150 µm, from about 75 µm to about 125 µm, from about 75 µm to about 100 µm, from about 100 µm to about 175 µm, from about 100 µm to about 150 µm, from about 100 µm to about 125 µm, from about 125 µm to about 175 µm, from about 125 µm to about 150 µm, and from about 150 µm to about 175 µm. In other aspects, thickness 52 can range from about 25 µm to 150 µm, from about 50 µm to 100 µm, or from about 60 µm to 80 µm. The thickness 52 of the cover element 50 can also be set at other thicknesses between the foregoing ranges.

The foldable electronic device module 100a depicted in FIG. 1 includes a cover element 50 with a cover element elastic modulus from about 20 GPa to 140 GPa, for example from about 20 GPa to about 120 GPa, from about 20 GPa to about 100 GPa, from about 20 GPa to about 80 GPa, from about 20 GPa to about 60 GPa, from about 20 GPa to about 40 GPa, from about 40 GPa to about 120 GPa, from about 40 GPa to about 100 GPa, from about 40 GPa to about 80 GPa, from about 40 GPa to about 60 GPa, from about 60 GPa to about 120 GPa, from about 60 GPa to about 100 GPa, from about 60 GPa to about 80 GPa, from about 80 GPa to about 120 GPa, from about 80 GPa to about 100 GPa, and from about 100 GPa to about 120 GPa. The cover element 50 may be a component having a glass composition or include at least one component having a glass composition. In the latter case, the cover element 50 can include one or more layers that include glass-containing materials, e.g., element 50 can be a polymer/glass composite configured with second phase glass particles in a polymeric matrix. In one aspect, the cover element 50 is a glass element characterized by an elastic modulus from about 50 GPa to about 100 GPa, or any elastic modulus value between these limits. In other aspects, the cover element elastic modulus is about 20 GPa, 30 GPa, 40 GPa, 50 GPa, 60 GPa, 70 GPa, 80 GPa, 90 GPa, 100 GPa, 110 GPa, 120 GPa, 130 GPa, or 140 GPa, for example, or any elastic modulus value between these values.

Again referring to FIG. 1, the foldable module 100a further includes: a stack 90a having a thickness 92a from about 50 µm to 600 µm; and a first adhesive 10a configured to join the stack 90a to the second primary surface 56 of the cover element 50, the first adhesive 10a characterized by a thickness 12a and a shear modulus from about 0.01 MPa to about 1000 MPa, for example, from about 0.1 MPa to about 800 MPa, from about 0.1 MPa to about 600 MPa, from about 0.1 MPa to about 400 MPa, from about 0.1 MPa to about 200 MPa, from about 0.1 MPa to about 1 MPa, from about 1 MPa to about 800 MPa, from about 1 MPa to about 600 MPa, from about 1 MPa to about 400 MPa, from about 1 MPa to about 200 MPa, from about 200 MPa to about 800 MPa, from about 200 MPa to about 600 MPa, from about 200 MPa to about 400 MPa, from about 400 MPa to about 800 MPa, from about 400 MPa to about 600 MPa, and from about 600 MPa to about 800 MPa. According to an implementation of the first aspect of the foldable module 100a, the first adhesive 10a is characterized by a shear modulus of about 0.01 MPa, 0.02 MPa, 0.03 MPa, 0.04 MPa, 0.05 MPa, 0.06 MPa, 0.07 MPa, 0.08 MPa, 0.09 MPa, 0.1 MPa, 0.2 MPa, 0.3 MPa, 0.4 MPa, 0.5 MPa, 0.6 MPa, 0.7 MPa, 0.8 MPa, 0.9 MPa, 1 MPa, 5 MPa, 10 MPa, 20 MPa, 30 MPa, 40 MPa, 50 MPa, 60 MPa, 70 MPa, 80 MPa, 90 MPa, 100 MPa, 200 MPa, 300 MPa, 400 MPA, 500 MPa, 600 MPa, 700 MPa, 800 MPa, 900 MPa, 1000 MPa, or any amount between these shear modulus values. Further, in certain aspects of the disclosure, the stack 90a is contemplated as having a thickness 92a below 50 µm, e.g., as low as about 10 µm, and the concepts elucidated in the disclosure will equally apply to foldable modules 100a containing such stacks 90a.

Still referring to FIG. 1, some aspects of the foldable module 100a include a flex-bond residual stress region, denoted by the combination of 50c and 50t, within the cover element 50. The flex-bond residual stress region is also generally disposed within a portion 52l' of the overall length 52l of the cover element 50. As such, the flex-bond residual stress region 50c, 50t is generally defined by a central region of the cover element 50 given by the dimensions: thickness 52×length of central portion 52l'×width, w. More particularly, the flex-bond residual stress region 50c, 50t exists through the thickness 52 of the cover element 50, ranging from a maximum compressive stress at the second primary surface 56 and maximum tensile residual stress at the first primary surface 54 at a central bend axis 210 through the module 100a and cover element 50. It should also be understood that module 100a, in certain aspects, can have a flex-bond residual stress region 50c, 50t such that the compressive residual stress region component 50c is adjacent to the first primary surface 54 and the tensile residual stress region component 50t is adjacent to the second primary surface 56 (not shown in FIG. 1).

In certain aspects as shown in FIG. 1, the flex-bond residual stress region 50c, 50t can be characterized by a compressive residual stress region component 50c with a thickness 52c and a tensile residual stress region component 50t with a thickness 52t. In some embodiments of the foldable modules 100a having a flex-bond residual stress region 50c, 50t, the maximum compressive residual stress at the second primary surface 56 of the cover element 50 at the central bend axis 210 can reach up to 300 MPa, up to 275 MPa, up to 250 MPa, up to 225 MPa, up to 200 MPa, up to 175 MPa, up to 150 MPa, up to 125 MPa, up to 100 MPa, up to 75 MPa, up to 50 MPa, up to 40 MPa, up to 30 MPa, up to 20 MPa, or up to 10 MPa, and all values between these maximum compressive stress levels at the second primary surface 56 of the cover element 50 (at the central bend axis 210). As understood by those with ordinary skill, the compressive residual stresses within the cover element 50 (as incorporated within the module 100a) can be measured through standard photoelasticity techniques, e.g., as described in Aben et al., "Modern Photoelasticity for Residual Stress Measurements," Strain, 44(1), pp. 40-48 (2008), hereby incorporated by reference in its entirety. For example, the residual stresses within and on the primary surfaces of the cover element 50 can be measured using commercially available instruments including but not limited to a surface stress polarimeter (e.g., a Strainoptics, Inc. GASP Polarimeter) and a surface stress meter (e.g., Orihara Industrial Co., Ltd. FSM-6000). To the extent that aspects of the module incorporating the cover element 50 are not sufficiently transmissive to measure residual stress in the cover element 50 using birefringence and photoelastic techniques, those with ordinary skill in the art would also recognize that the residual stress can be measured in the cover element 50 through other techniques. For example, the cover element 50 could be decoupled from the module 100a and displacement of the cover element 50 associated with the residual stress can be measured to calculate the residual stresses that existed in the cover element 50 prior to decoupling from the module 100a.

Referring again to FIG. 1, the flex-bond residual stress region 50c, 50t can be characterized by a residual stress that varies through the thickness 52 of the cover element 50 within the central portion 52l'. In some embodiments, the central portion 52l' has a length dimension of about ⅕ the length 52l of the cover element 50. In certain aspects, the residual stress continuously varies in a substantially linear function through the thickness 52 of the cover element 50 at the central bend axis 210, e.g., from the maximum compressive residual stress at the second primary surface 56 (e.g., −200 MPa) to the maximum tensile residual stress (e.g., +100 MPa) at the first primary surface 54 of the cover element. It should also be understood that, in some embodiments, the flex-bond residual tensile stress region component does not extend fully to the end of the central portion 52l'; consequently, the residual stresses are primarily compressive away from the bend axis 210, but within the central portion 52l'. Consequently, application-driven tangential stresses in tension at the second primary surface 56 of the cover element (e.g., from bending the cover element upward such that the first primary surface 54 is concave and the second primary surface 56 is convex) are effectively reduced by the presence of a flex-bond residual stress region, particularly the compressive stress levels associated with the compressive residual stress region 52c. As also understood by those with ordinary skill, application-driven tangential stresses in tension at the first primary surface 54 of the cover element can be effectively reduced by the presence of a flex-bond residual stress region when the compressive residual stress region component 50c is located adjacent to the first primary surface 54 (not shown in FIG. 1).

As used herein, the term "residual stress region" relates to the existence of a residual stress state in an as-processed cover element of a foldable module that principally results from mechanical, non-thermal interactions between the components of the module during processing. As also used herein, the term "flex-bond residual stress region" relates to the existence of a residual stress state through the thickness and within a central portion of an as-processed cover element in a foldable module that ranges from a maximum compressive residual stress at the second primary surface of the cover element (i.e., as adhered to a stack with an adhesive) to a maximum tensile residual stress at the first primary surface of the cover element (i.e., not directly adhered to a component within the module) at the central bend axis of the cover element. The "flex-bond residual stress region" in the cover element of the foldable module can be produced by a flex-bonding process. In particular, the cover element and a stack can be affixed by a first adhesive at a second primary surface of the cover element. The affixed module is then flexed to a flex radius, typically between about 5 mm to about 50 mm in a two-point configuration. The adhesive is then cured and then the module is returned to an un-bent configuration. As used herein, the "flex-bond residual stress region" develops within the cover element as the module returns to an un-bent configuration.

Referring again to FIG. 1, the first adhesive $10a$ of the foldable module $100a$ can be characterized by a glass transition temperature of at least 80° C., at least 90° C., at least 100° C., at least 110° C., at least 120° C., at least 130° C., at least 140° C., at least 150° C., at least 160° C., at least 170° C., at least 180° C., at least 190° C., at least 200° C., at least 210° C., at least 220° C., at least 230° C., at least 240° C. and at least 250° C., along with all glass transition temperature lower limits between these values. In certain aspects of the foldable electronic device modules $100a$, the glass transition temperature of the first adhesive $10a$ can be selected to ensure that it experiences no significant change in shear modulus upon exposure to temperatures associated with module processing after the adhesive $10a$ is cured within the module $100a$ and/or operating temperatures (e.g., 80° C. or greater) of the foldable electronic device module $100a$ within its application environment. More particularly, selecting a first adhesive $10a$ with a glass transition temperature that exceeds the application-related and/or processing-related temperatures of the module $100a$ ensures that the first adhesive $10a$ does not experience temperature-dependent, stress relaxation. Any stress relaxation of the adhesive $10a$ within the module $100a$ can lead to a loss or reduction in the magnitude of the residual stresses within the residual stress region $50c$, $50t$ in the cover element $50$ developed with a flex-bonding process, for example.

Other aspects of the foldable modules $100a$ in the disclosure incorporate an adhesive $10a$ with a relatively higher shear modulus, e.g., from about 0.1 MPa to about 100 MPa, as compared to the shear modulus of at least some conventional adhesives employed in electronic device applications according to the general field of the disclosure. The use of such adhesives $10a$ with relatively higher shear modulus values unexpectedly provides a significant decrease in tensile stresses observed at the second primary surface $56$ of the cover element $50$ upon bending the foldable electronic device module $100a$ in a direction away from the second primary surface $56$—i.e., by bending the module $100a$ such that the second primary surface $56$ exhibits a convex shape. In particular, a higher shear modulus adhesive provides more coupling between the cover element $50$ and the rest of the module $100a$ when the module is bent in an upward configuration (see FIG. 4B). Thus, by controlling the stiffness of the adhesive $10a$, one can control the final residual stresses within the cover element $50$. In effect, the use of higher shear modulus adhesives $10a$ within the module $100a$ tends to shift the neutral axis away from the second primary surface $56$ of the cover element $50$, thereby reducing the magnitude of tensile stresses at this surface. In contrast, those in the field facing the same concerns and lacking the benefit of this disclosure would have typically selected a less rigid or low shear modulus adhesive as a more compliant adhesive would generally be considered to improve the flexibility of the module.

Still referring to FIG. 1, certain aspects of the foldable module $100a$ can be configured to minimize bending forces associated with bending the entire module. More particularly, the use of a first adhesive $10a$ with a relatively low shear modulus value (e.g., 0.01 MPa to 0.1 MPa) can unexpectedly reduce the overall bending force required to fold or otherwise bend the entire module $100a$ in an upward or downward direction such that the first primary surface $54$ exhibits a concave or convex shape, respectively. These bending force reductions associated with certain aspects of the foldable module $100a$ through the use of a first adhesive $10a$ with a relatively low elastic shear modulus value are obtained relative to a foldable module (e.g., foldable module $100a$) with an adhesive between the cover element and the stack (e.g., first adhesive $10a$) having a shear modulus that exceeds 0.1 MPa.

Figure 4:
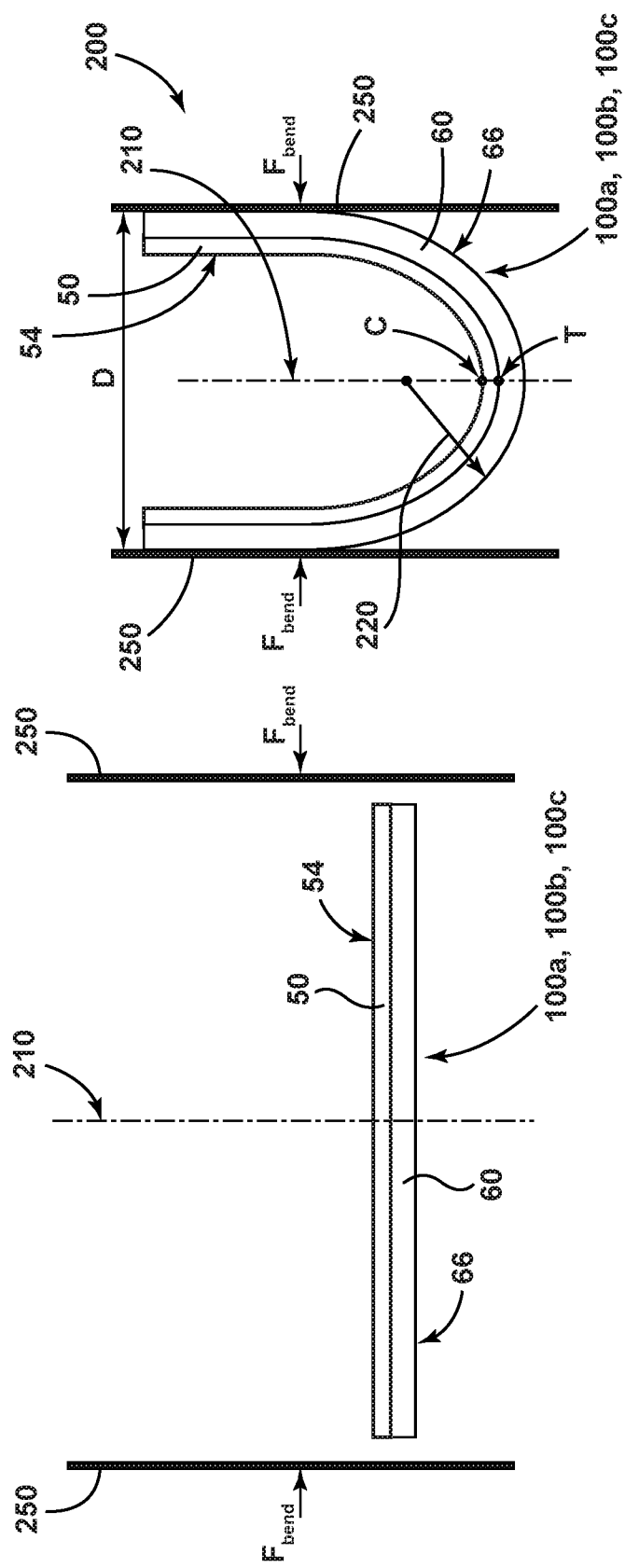
FIGS. 4A & 4B depict foldable electronic device modules in an un-bent and a bent configuration, respectively, within a two-point test apparatus according to an aspect of the disclosure.

In another embodiment of the foldable module $100a$ depicted in FIG. 1, the first adhesive $10a$ is characterized by a thickness $12a$ from about 5 µm to about 60 µm, for example, from about 5 µm to about 50 µm, from about 5 µm to about 40 µm, from about 5 µm to about 30 µm, from about 5 µm to about 20 µm, from about 5 µm to about 15 µm, from about 5 µm to about 10 µm, from about 10 µm to about 60 µm, from about 15 µm to about 60 µm, from about 20 µm to about 60 µm, from about 30 µm to about 60 µm, from about 40 µm to about 60 µm, from about 50 µm to about 60 µm, from about 55 µm to about 60 µm, from about 10 µm to about 50 µm, from about 10 µm to about 40 µm, from about 10 µm to about 30 µm, from about 10 µm to about 20 µm, from about 10 µm to about 15 µm, from about 20 µm to about 50 µm, from about 30 µm to about 50 µm, from about 40 µm to about 50 µm, from about 20 µm to about 40 µm, and from about 20 µm to about 30 µm. Other embodiments have a first adhesive $10a$ characterized by a thickness $12a$ of about 5 µm, 10 µm, 15 µm, 20 µm, 25 µm, 30 µm, 35 µm, 40 µm, 45 µm, 50 µm, 55 µm, 60 µm, or any thickness between these thickness values. In one aspect, the thickness $12a$ of the first adhesive $10a$ is from about 10 µm to 20 µm. Some aspects of the foldable modules $100a$ incorporate an adhesive $10a$ with a thickness (e.g., from about 10 µm to about 20 µm), that is relatively lower than the thicknesses of conventional adhesives employed in such electronic device applications. The use of such adhesives $10a$ with relatively lower thickness values provides a significant decrease in tensile stresses at the second primary surface $56$ of the cover element $50$ upon bending the foldable electronic device module $100a$ in a direction away from the second primary surface $56$—i.e., by bending the module $100a$ such that the second primary surface $56$ exhibits a convex shape. By decreasing the thickness of the adhesive, more coupling between the cover element $50$ and the module $100a$ under bending (e.g., as shown in FIG. 4B) is obtained. Hence, by controlling the thickness of the adhesive $10a$ near the cover element $50$, lower amounts of tensile stresses are developed at the second primary surface $56$. In contrast, those in the field facing the same concerns and lacking the benefit of this disclosure would have typically not appreciated that the thickness of a relatively thin adhesive, as compared to the overall thickness of the module, could play such a significant role in the magnitude of the tensile stresses at the second primary surface $56$ of the cover element $50$. In addition, while it is believed that further decreases in the thickness $12a$ of the adhesive $10a$ will result in additional reductions in tensile stresses at the second primary surface 56 of the element 50, the thickness 12*a* can be limited by the bond strength for joining the element 50 to the underlying stack 90*a*, depending on the application requirements for the module 100*a*.

Still referring to FIG. 1, certain aspects of the foldable module 100*a* can be configured to minimize bending forces associated with bending the entire module by controlling the thickness of the first adhesive 10*a*. More particularly, the use of a first adhesive 10*a* with a range of thicknesses 12*a* (e.g., from about 10 μm to about 40 μm) can reduce the overall bending force required to fold or otherwise bend the entire module 100*a* in an upward or downward direction such that the first primary surface 54 exhibits a concave or convex shape, respectively. These bending force reductions associated with certain aspects of the foldable module 100*a* through the use of a first adhesive 10*a* within a prescribed range of thicknesses are obtained relative to a foldable module (e.g., foldable module 100*a*) with an adhesive between the cover element and the stack (e.g., first adhesive 10*a*) having a relatively small thickness (e.g. less than 10 μm) or a relatively large thickness (e.g., more than 40 μm).

In some embodiments of the foldable module 100*a* depicted in FIG. 1, the first adhesive 10*a* is further characterized by a Poisson's ratio from about 0.1 to about 0.5, for example, from about 0.1 to about 0.45, from about 0.1 to about 0.4, from about 0.1 to about 0.35, from about 0.1 to about 0.3, from about 0.1 to about 0.25, from about 0.1 to about 0.2, from about 0.1 to about 0.15, from about 0.2 to about 0.45, from about 0.2 to about 0.4, from about 0.2 to about 0.35, from about 0.2 to about 0.3, from about 0.2 to about 0.25, from about 0.25 to about 0.45, from about 0.25 to about 0.4, from about 0.25 to about 0.35, from about 0.25 to about 0.3, from about 0.3 to about 0.45, from about 0.3 to about 0.4, from about 0.3 to about 0.35, from about 0.35 to about 0.45, from about 0.35 to about 0.4, and from about 0.4 to about 0.45. Other embodiments include a first adhesive 10*a* characterized by a Poisson's ratio of about 0.1, 0.15, 0.2, 0.25, 0.3, 0.35, 0.4, 0.45, 0.5, or any Poisson's ratio between these values. In one aspect, the Poisson's ratio of the first adhesive 10*a* is from about 0.1 to about 0.25.

Referring again to FIG. 1, the stack 90*a* of the foldable module 100*a* further includes a panel 60 having first and second primary surfaces 64, 66, and a panel elastic modulus from about 300 MPa to about 10 GPa, for example, from about 300 MPa to 8000 MPa, from about 300 MPa to 6000 MPa, from about 300 MPa to 4000 MPa, from about 300 MPa to 2000 MPa, from about 300 MPa to 1000 MPa, from about 300 MPa to 500 MPa, from about 500 MPa to 8000 MPa, from about 500 MPa to 6000 MPa, from about 500 MPa to 4000 MPa, from about 500 MPa to 2000 MPa, from about 500 MPa to 1000 MPa, from about 1000 MPa to 8000 MPa, from about 1000 MPa to 6000 MPa, from about 1000 MPa to 4000 MPa, from about 1000 MPa to 2000 MPa, from about 2000 MPa to 8000 MPa, from about 2000 MPa to 6000 MPa, from about 2000 MPa to 4000 MPa, from about 4000 MPa to 8000 MPa, from about 4000 MPa to 6000 MPa, and from about 6000 MPa to 8000 MPa. The stack 90*a* also includes one or more electronic devices 102 coupled to the panel 60. As also depicted in FIG. 1, the stack 90*a* can also include a stack element 75. The stack element 75 can include various features associated with the foldable electronic device module 100*a*, depending on its end use application. For example, the stack element 75 may include one or more of a touch sensor, polarizer, other electronic devices, and adhesives or other compounds for joining these features to the panel 60.

In FIG. 1, the cover element 50 of the foldable module 100*a* is further characterized by a puncture resistance of at least 1.5 kgf when the first primary surface 54 of the cover element is loaded with a tungsten carbide ball having a diameter of 1.5 mm. Typically, puncture testing according to aspects of this disclosure is performed under displacement control at cross-head speed of 0.5 mm/min. In some aspects, the cover element 50 is characterized by a puncture resistance of greater than about 1.5 kgf at a 5% or greater failure probability within a Weibull plot (i.e., based on puncture test data, there is a 5% or greater probability of failure when a puncture load of 1.5 kgf is applied to the cover element). The cover element 50 can also be characterized by a puncture resistance of greater than about 3 kgf at the Weibull characteristic strength (i.e., a 63.2% or greater). In certain aspects, the cover element 50 of the foldable electronic device module 100*a* can resist puncture at about 2 kgf or greater, 2.5 kgf or greater, 3 kgf or greater, 3.5 kgf or greater, 4 kgf or greater, and even higher ranges (e.g., within an acceptable application-related failure probability). The cover element 50 can also be characterized by a pencil hardness of greater than or equal to 8H.

In certain other aspects of the foldable module 100*a*, the cover element 50 can be characterized by a puncture resistance according to an alternative test method that employs a stainless steel pin having a flat bottom with a 200 μm diameter (rather than a tungsten carbide ball), performed under displacement control at 0.5 mm/min cross-head speed. In certain aspects, the stainless steel pin is replaced with a new pin after a specified quantity of tests (e.g., 10 tests) to avoid bias that could result from deformation of the metal pin associated with the testing of materials possessing a higher elastic modulus (e.g., cover element 50). In these aspects, the cover element 50 has a puncture resistance of at least 1.5 kgf when the second primary surface 56 of the element 50 is supported by (i) an approximately 25 μm thick pressure-sensitive adhesive ("PSA") having an elastic modulus from about 0.01 MPa to about 1 MPa and (ii) an approximately 50 μm thick polyethylene terephthalate layer ("PET") having an elastic modulus less than about 10 GPa, for example from about 2 GPa to about 4 GPa, and the first primary surface 54 of the element 50 is loaded with a stainless steel pin having a flat bottom with a 200 μm diameter. According to other aspects of the foldable module 100*a*, the cover element 50 can be characterized by a puncture resistance according to a test method that employs a tungsten carbide ball having a diameter of 1.5 mm with a PSA/PET support structure, performed under displacement control at 0.5 mm/min cross-head speed. In these aspects, the element 50 has a puncture resistance of at least 1.5 kgf when the second primary surface 56 of the element 50 is supported by (i) an approximately 25 μm thick pressure-sensitive adhesive ("PSA") having an elastic modulus from about 0.01 MPa to about 1 MPa and (ii) an approximately 50 μm thick polyethylene terephthalate layer ("PET") having an elastic modulus less than about 10 GPa, for example from about 2 GPa to about 4 GPa, and the first primary surface 54 of the element 50 is loaded with a tungsten carbide ball having a diameter of 1.5 mm. It is also believed that puncture testing according to the foregoing approaches with a stainless steel pin having a flat bottom with a 200 μm diameter will produce results consistent with employing the same approach (e.g., PSA/PET support structure) and test conditions with a tungsten carbide ball having a diameter of 1.5 mm.

Referring again to FIG. 1, the foldable electronic device module 100*a*, according to a first aspect of the disclosure, is characterized by a tangential stress at the second primary surface 56 of the cover element 50 of no greater than 1000 MPa in tension (i.e., at point "T," as shown in FIG. 4B) upon bending the module in a two-point configuration to a bend radius 220 (see FIG. 4B) from about 20 mm to about 1 mm such that the first primary surface 54 is in compression (i.e., at point "C," as shown in FIG. 4B) and the bend radius 220 is measured from a center point above the first primary surface 54 of the cover element 50 to the second primary surface 66 of the panel 60. In certain implementations, the tangential stress (in tension) at the second primary surface 56 of the cover element 50 is no greater than about 1000 MPa, 950 MPa, 925 MPa, 900 MPa, 875 MPa, 850 MPa, 825 MPa, 800 MPa, 775 MPa, 750 MPa, 725 MPa, 700 MPa, or any amount between these tangential stress upper limits, upon bending of the module to a radius from about 20 mm to about 1 mm in a two-point configuration, for example, 20 mm, 19.75 mm, 19.5 mm, 19.25 mm, 19 mm, 18.5 mm, 17.5 mm, 17 mm, 16.5 mm, 16 mm, 15.5 mm, 15 mm, 14.5 mm, 14 mm, 13.5 mm, and 13 mm, 12.5 mm, 12 mm, 11.5 mm, 11 mm, 10.5 mm, 10 mm, 9.5 mm, 9 mm, 8.5 mm, 7.5 mm, 7 mm, 6.5 mm, 6 mm, 5.5 mm, 5 mm, 4.5 mm, 4 mm, 3.5 mm, 3.25 mm, 3 mm, 2.75 mm, 2.5 mm, 2.25 mm, 2 mm, 1.75 mm, 1.5 mm, 1.25 mm, or 1 mm, or for example from about 20 mm to about 1 mm, from about 20 mm to about 2 mm, from about 20 mm to about 3 mm, from about 20 mm to about 4 mm, from about 20 mm to about 5 mm, from about 20 mm to about 6 mm, from about 20 mm to about 7 mm, from about 20 mm to about 8 mm, from about 20 mm to about 9 mm, from about 20 mm to about 10 mm, from about 20 mm to about 11 mm, from about 20 mm to about 12 mm, from about 20 mm to about 13 mm, from about 20 mm to about 14 mm, from about 20 mm to about 15 mm, from about 20 mm to about 16 mm, from about 20 mm to about 17 mm, from about 20 mm to about 18 mm, from about 20 mm to about 19 mm, from about 19 mm to about 1 mm, from about 18 mm to about 1 mm, from about 17 mm to about 1 mm, from about 16 mm to about 1 mm, from about 15 mm to about 1 mm, from about 14 mm to about 1 mm, from about 13 mm to about 1 mm, from about 12 mm to about 1 mm, from about 11 mm to about 1 mm, from about 10 mm to about 1 mm, from about 10 mm to about 2 mm, from about 9 mm to about 2 mm, from about 8 mm to about 2 mm, from about 7 mm to about 2 mm, from about 6 mm to about 2 mm, from about 5 mm to about 2 mm, from about 4 mm to about 2 mm, from about 3 mm to about 2 mm, from about 19 mm to about 3 mm, from about 18 mm to about 4 mm, from about 17 mm to about 5 mm, from about 16 mm to about 6 mm, from about 15 mm to about 7 mm, from about 14 mm to about 8 mm, from about 13 mm to about 9 mm, from about 12 mm to about 10 mm. In certain other aspects of the foldable modules subjected to a bend radius greater than about 20 mm up to about 100 mm in a two-point configuration, the tangential stress at the second primary surface 56 of the cover element 50 can be substantially reduced through careful selection of the elastic modulus and/or the thickness of one or more of the adhesives in the module.

Still referring to FIG. 1, the foldable electronic device module 100a, according to another implementation, can be characterized by a bending force ($F_{bend}$) of no greater than 150 Newtons (N) as the module is bent inward by a test apparatus to a bend radius 220, the bend radius being approximately half the distance (D) between two test plates 250 (see FIGS. 4A & 4B). In certain implementations, the bending force is no greater than about 150 N, 140 N, 130 N, 120 N, 110 N, 100 N, 90 N, 80 N, 70 N, 60 N, 50 N, 40 N, 30 N, 20 N, 10 N, 5 N, or any amount between these bending force upper limits, upon bending of the module to a radius from about 20 mm to about 3 mm (i.e., a plate distance (D) of about 40 to about 6 mm), for example, 20 mm, 19.75 mm, 19.5 mm, 19.25 mm, 19 mm, 18.5 mm, 17.5 mm, 17 mm, 16.5 mm, 16 mm, 15.5 mm, 15 mm, 14.5 mm, 14 mm, 13.5 mm, and 13 mm, 12.5 mm, 12 mm, 11.5 mm, 11 mm, 10.5 mm, 10 mm, 9.5 mm, 9 mm, 8.5 mm, 7.5 mm, 7 mm, 6.5 mm, 6 mm, 5.5 mm, 5 mm, 4.5 mm, 4 mm, 3.5 mm, 3.25 mm or 3 mm. As outlined earlier, these relatively low bending forces can be obtained in the foldable electronic device module 100a through tailoring of the material properties and/or thickness of the first adhesive 10a.

In other aspects of the foldable electronic device module 100a depicted in FIG. 1, the cover element 50 can be characterized by an absence of failure when the element is held at the bend radius 220 (see FIG. 4B) from about 1 mm to 20 mm for at least 60 minutes at about 25° C. and about 50% relative humidity. As used herein, the terms "fail," "failure" and the like refer to breakage, destruction, delamination, crack propagation or other mechanisms that leave the foldable modules, assemblies and articles of this disclosure unsuitable for their intended purpose. When the cover element 50 is held at the bend radius 220 under these conditions (i.e., by virtue of a bending applied to the module 100a), bending forces are applied to the ends of the element 50. In most (if not all) aspects of the foldable electronic device modules 100a, tensile stresses are generated at the second primary surface 56 of the element 50 and compressive stresses are generated at the first primary surface 54 during the application of bending forces to the foldable module 100a such that the first primary surface 54 is bent upwards into a concave shape (see FIG. 4B). In other aspects, the bend radius 220 can be set to a range from about 5 mm to 7 mm without causing a failure in the cover element 50. Without being bound by theory, it is believed that the cover element 50 also can be characterized, in certain aspects of the disclosure, by an absence of failure when the element 50 (including the entire foldable module 100a) is held at a bend radius 220 from about 3 mm to about 10 mm for at least 120 hours at about 25° C. and about 50% relative humidity. It should also be understood that bend testing results associated with the foldable electronic device modules 100a depicted in FIG. 1 can vary under testing conditions with temperatures and/or humidity levels that differ from the foregoing test parameters.

In some aspects of the foldable module 100a, the cover element 50 is characterized by a high-cycle fatigue stress resistance. In particular, the cover element 50 can be characterized by no cohesive failures upon bending the module, in a two-point configuration, from a relaxed test state configuration to a constant, defined bend radius 220 (see FIGS. 4A & 4B) (i.e., ranging from 20 mm to about 1 mm) for at least 200,000 bend cycles. As understood by those with ordinary skill, the relaxed test state configuration can reflect a flat, planar or substantially planar configuration (e.g., a bend radius exceeding 100 mm) of the module 100a. As also understood by those with ordinary skill, a relaxed test state configuration is one in which the cover element experiences minimal stresses relative to those subjected to the cover element at the desired bend radius. In other aspects of the disclosure, the cover element 50 is characterized by no cohesive failures upon bending the module, in a two-point configuration, from a relaxed test state configuration to a bend radius 220 that ranges from about 20 mm to about 1 mm for about 100,000 cycles, 110,000 cycles, 120,000 cycles, 130,000 cycles, 140,000 cycles, 150,000 cycles, 160,000 cycles, 170,000 cycles, 180,000 cycles, 190,000 cycles, 200,000 cycles, 225,000 cycles, 250,000 cycles, 275,000 cycles, and 300,000 cycles, or any amount of bend cycles between these values. In certain other applications of the foldable module 100a subjected to a less severe bend radius 220 greater than about 20 mm up to about 100 mm at high cycles (i.e., >100,000 cycles), the high-cycle fatigue stress performance of the cover element can be substantially increased through the development of a residual stress region, and/or careful selection of the elastic modulus and/or the thickness of the adhesives in the module.

In certain aspects of the foldable module 100a, the cover element 50 can include a glass layer. In other aspects, the cover element 50 can include two or more glass layers. As such, the thickness 52 reflects the sum of the thicknesses of the individual glass layers making up the cover element 50. In those aspects in which the cover element 50 includes two or more individual glass layers, the thickness of each of the individual glass layers is no less than 1 μm. For example, the cover element 50 employed in the module 100a can include three glass layers, each having a thickness of about 8 μm, such that the thickness 52 of the cover element 50 is about 24 μm. It should also be understood, however, that the cover element 50 could include other non-glass layers (e.g., compliant polymer layers) sandwiched between multiple glass layers. In other implementations of the module 100a, the cover element 50 can include one or more layers that include glass-containing materials, e.g., element 50 can be a polymer/glass composite configured with second phase glass particles in a polymeric matrix.

In FIG. 1, a foldable electronic device module 100a including a cover element 50 comprising a glass material can be fabricated from alkali-free aluminosilicate, borosilicate, boroaluminosilicate, and silicate glass compositions. The cover element 50 can also be fabricated from alkali-containing aluminosilicate, borosilicate, boroaluminosilicate, and silicate glass compositions. In certain aspects, the cover element 50 can also be fabricated from glass-ceramic compositions and, for certain applications, the glass-ceramic composition results in a cover element 50 that is optically transmissive. In certain aspects, alkaline earth modifiers can be added to any of the foregoing compositions for the cover element 50. In one exemplary aspect, glass compositions according to the following are suitable for a cover element 50 having one or more glass layers: $SiO_2$ at 64 to 69% (by mol %); $Al_2O_3$ at 5 to 12%; $B_2O_3$ at 8 to 23%; MgO at 0.5 to 2.5%; CaO at 1 to 9%; SrO at 0 to 5%; BaO at 0 to 5%; $SnO_2$ at 0.1 to 0.4%; $ZrO_2$ at 0 to 0.1%; and $Na_2O$ at 0 to 1%. In another exemplary aspect, the following composition is suitable for the glass layer 50a: $SiO_2$ at ~67.4% (by mol %); $Al_2O_3$ at ~12.7%; $B_2O_3$ at ~3.7%; MgO at ~2.4%; CaO at 0%; SrO at 0%; $SnO_2$ at ~0.1%; and $Na_2O$ at ~13.7%. In a further exemplary aspect, the following composition is also suitable for a glass layer employed in the cover element 50: $SiO_2$ at 68.9% (by mol %); $Al_2O_3$ at 10.3%; $Na_2O$ at 15.2%; MgO at 5.4%; and $SnO_2$ at 0.2%. Various criteria can be used to select the composition for a cover element 50 comprising a glass material, including but not limited to ease of manufacturing to low thickness levels while minimizing the incorporation of flaws; ease of bonding and flexing within the module during processing to facilitate the development of a flex-bond residual stress region; ease of development of a compressive stress region to offset tensile stresses generated during bending, optical transparency; and corrosion resistance.

The cover element 50 employed in the foldable module 100a can adopt a variety of physical forms and shapes. From a cross-sectional perspective, the element 50, as a single layer or multiple layers, can be flat or planar. In some aspects, the element 50 can be fabricated in non-rectilinear, sheet-like forms depending on the final application. As an example, a mobile display device having an elliptical display and bezel could employ a cover element 50 having a generally elliptical, sheet-like form.

Still referring to FIG. 1, the cover element 50 of the foldable electronic device module 100a can, in certain aspects of the disclosure, comprise a glass layer or component with one or more compressive stress regions (not shown) that extend from the first and/or second primary surfaces 54, 56 to a selected depth in the cover element 50. Further, in certain aspects of the module 100a, edge compressive stress regions (not shown) that extend from edges of the element 50 (e.g., edges normal or substantially normal to primary surfaces 54, 56) to a selected depth can also be developed. For example, the compressive stress region or regions (and/or edge compressive stress regions) contained in a glass cover element 50 can be formed with an ion-exchange ("IOX") process. As used herein, an IOX process is employed to develop one or more "ion-exchanged compressive stress regions" within the cover element. As another example, a glass cover element 50 can comprise various tailored glass layers and/or regions that can be employed to develop one or more such compressive stress regions through a mismatch in coefficients of thermal expansion ("CTE") associated with the layers and/or regions. As used herein, such design approaches result in a "CTE-induced compressive stress regions" within the cover element.

In those aspects of the device module 100a with a cover element 50 having one or more ion-exchanged compressive stress regions formed with an IOX process, the compressive stress region(s) can include a plurality of ion-exchangeable metal ions and a plurality of ion-exchanged metal ions, the ion-exchanged metal ions selected so as to produce compressive stress in the compressive stress region(s). In some aspects of the module 100a containing ion-exchanged compressive stress region(s), the ion-exchanged metal ions have an atomic radius larger than the atomic radius of the ion-exchangeable metal ions. The ion-exchangeable ions (e.g., $Na^+$ ions) are present in the glass cover element 50 before being subjected to the ion exchange process. Ion-exchanging ions (e.g., $K^+$ ions) can be incorporated into the glass cover element 50, replacing some of the ion-exchangeable ions within region(s) within the element 50 that ultimately become the ion-exchanged compressive stress region(s). The incorporation of ion-exchanging ions, for example, $K^+$ ions, into the cover element 50 can be effected by submersing the element 50 (e.g., prior to formation of the complete module 100a) in a molten salt bath containing ion-exchanging ions (e.g., molten $KNO_3$ salt). In this example, the $K^+$ ions have a larger atomic radius than the $Na^+$ ions and tend to generate local compressive stress in the glass cover element 50 wherever present, e.g., in the ion-exchanged compressive stress region(s).

Depending on the ion-exchanging process conditions employed for the cover element 50 employed in the foldable electronic device module 100a depicted in FIG. 1, the ion-exchanging ions can be imparted from the first primary surface 54 of the cover element 50 down to a first ion exchange depth (not shown), establishing an ion exchange depth-of-layer ("DOL"). Similarly, a second ion-exchanged compressive stress region can be developed in the element 50 from the second primary surface 56 down to a second ion exchange depth. Compressive stress levels within the DOL that far exceed 100 MPa can be achieved with such IOX processes, up to as high as 2000 MPa. The compressive stress levels in the ion-exchanged compressive stress region(s) within the cover element 50 can serve to offset tensile stresses generated in the cover element 50 upon bending of the foldable electronic device module 100a. In addition, the compressive stress levels in the ion-exchanged compressive stress region(s) can be superimposed over other stress regions present within the cover element (e.g., CTE-induced compressive stress regions) in certain embodiments of the foldable electronic device modules.

Referring again to FIG. 1, the foldable electronic device module 100a can, in some implementations, include one or more edge ion-exchanged compressive stress regions in the cover element 50 at edges that are normal to the first and second primary surfaces 54, 56, each defined by a compressive stress of at least 100 MPa. It should be understood that such edge ion-exchanged compressive stress regions can be developed in the cover element 50 at any of its edges or surfaces distinct from its primary surfaces, depending on the shape or form of element 50. For example, in an implementation of foldable module 100a having an elliptical-shaped cover element 50, edge ion-exchanged compressive stress regions can be developed inward from the outer edge of the element that is normal (or substantially normal) from the primary surfaces of the element. IOX processes that are similar in nature to those employed to generate the ion-exchanged compressive stress region(s) in proximity to the primary surfaces 54, 56 can be deployed to produce these edge ion-exchanged compressive stress regions. More specifically, any such edge ion-exchanged compressive stress regions in the cover element 50 can be used to offset tensile stresses generated at the edges of the element through, for example, bending of the cover element 50 (and module 100a) across any of its edges and/or non-uniform bending of the cover element 50 at its primary surfaces 54, 46. Alternatively, or as an addition thereto, without being bound by theory, any such edge ion-exchanged compressive stress regions employed in the cover element 50 may offset adverse effects from an impact or abrasion event at or to the edges of the element 50 within the module 100a.

Referring again to FIG. 1, in those aspects of the device module 100a with a cover element 50 having one or more CTE-induced compressive stress regions formed through a mismatch in CTE of regions or layers within the element 50, these compressive stress regions are developed by tailoring of the structure of the element 50. For example, CTE differences within the element 50 can produce one or more CTE-induced compressive stress regions within the element. In one example, the cover element 50 can comprise a core region or layer that is sandwiched by clad regions or layers, each substantially parallel to the primary surfaces 54, 56 of the element. Further, the core layer is tailored to a CTE that is greater than the CTE of the clad regions or layers (e.g., by compositional control of the core and clad layers or regions). After the cover element 50 is cooled from its fabrication processes, the CTE differences between the core region or layer and the clad regions or layers cause uneven volumetric contraction upon cooling, leading to the development of residual stress (CTE-induced) in the cover element 50 manifested in the development of CTE-induced compressive stress regions below the primary surfaces 54, 56 within the clad region or layers. Put another way, the core region or layer and the clad regions or layers are brought into intimate contact with one another at high temperatures; and these layers or regions are then cooled to a low temperature such that the greater volume change of the high CTE core region (or layer) relative to the low CTE clad regions (or layers) creates the CTE-induced compressive stress regions in the clad regions or layers within the cover element 50.

Still referring to the cover element 50 in the module 100a that is depicted in FIG. 1 with CTE-induced compressive stress regions, the CTE-induced compressive stress regions reach from the first primary surface 54 down to a first CTE region depth and the second primary surface 56 to a second CTE region depth, respectively, thus establishing CTE-related DOLs for each of the CTE-induced compressive stress regions associated with the respective primary surfaces 54, 56 and within the clad layer or regions. In some aspects, the compressive stress levels in these CTE-induced compressive stress regions can exceed 150 MPa. Maximizing the difference in CTE values between the core region (or layer) and the clad regions (or layers) can increase the magnitude of the compressive stress developed in the compressive stress regions upon cooling of the element 50 after fabrication. In certain implementations of the foldable electronic device module 100a with a cover element 50 having such CTE-induced compressive stress regions, the cover element 50 employs a core region and clad regions with a thickness ratio of greater than or equal to 3 for the core region thickness divided by the sum of the clad region thicknesses. As such, maximizing the size of the core region and/or its CTE relative to the size and/or CTE of the clad regions can serve to increase the magnitude of the compressive stress levels observed in the CTE-induced compressive stress regions of the foldable module 100a.

Among other advantages, the compressive stress regions (e.g., as developed through the flex-bond, IOX- and/or CTE-related approaches outlined in the foregoing paragraphs) can be employed within the cover element 50 to offset tensile stresses generated in the element upon bending of the foldable module 100a, particularly tensile stresses that reach a maximum on one of the primary surfaces 54, 56, depending on the direction of the bend. In certain aspects, the compressive stress region (e.g., as including at least one of a flex-bond residual stress region, CTE-induced compressive stress region and ion-exchanged compressive stress region) can include a compressive stress of at least about 100 MPa at the primary surfaces 54, 56 of the cover element 50. In some aspects, the compressive stress at the primary surfaces is from about 600 MPa to about 1000 MPa. In other aspects, the compressive stress can exceed 1000 MPa at the primary surfaces, up to 2000 MPa, depending on the process employed to produce the compressive stress in the cover element 50. The compressive stress can also range from about 100 MPa to about 600 MPa at the primary surfaces of the element 50 in other aspects of this disclosure. In an additional aspect, the compressive stress region (or regions) within the cover element 50 of the module 100a can exhibit a compressive stress from about 100 MPa to about 2000 MPa, for example, from about 100 MPa to about 1500 MPa, from about 100 MPa to about 1000 MPa, from about 100 MPa to about 800 MPa, from about 100 MPa to about 600 MPa, from about 100 MPa to about 400 MPa, from about 100 MPa to about 200 MPa, from about 200 MPa to about 1500 MPa, from about 200 MPa to about 1000 MPa, from about 200 MPa to about 800 MPa, from about 200 MPa to about 600 MPa, from about 200 MPa to about 400 MPa, from about 400 MPa to about 1500 MPa, from about 400 MPa to about 1000 MPa, from about 400 MPa to about 800 MPa, from about 400 MPa to about 600 MPa, from about 600 MPa to about 1500 MPa, from about 600 MPa to about 1000 MPa, from about 600 MPa to about 800 MPa, from about 800 MPa to about 1500 MPa, from about 800 MPa to about 1000 MPa, or from about 1000 MPa to about 1500 MPa.

Within such a compressive stress region employed in the cover element 50 of a foldable electronic device module 100a, the compressive stress can stay constant, decrease or increase as a function of depth from the primary surfaces down to one or more selected depths or through the entire thickness of the cover element. As such, various compressive stress profiles (e.g., linear, non-linear, stepped, etc.) can be employed in the compressive stress region, depending on the contribution of one or more stress regions (e.g., flex-bond residual stress region, CTE-induced compressive stress region and ion-exchanged compressive stress region). Further, in some aspects, the depth of each of the compressive stress regions can be set at approximately 15 μm or less from the primary surfaces 54, 56 of the cover element 50. In other aspects, the depth of the compressive stress region(s) can be set such that they are approximately ⅓ of the thickness 52 of the cover element 50 or less, or 20% of the thickness 52 of the cover element 50 or less, from the first and/or second primary surfaces 54, 56.

Referring again to FIG. 1, the foldable electronic device module 100a can include a cover element 50 comprising a glass material having one or more compressive stress regions with a maximum flaw size of 5 μm or less at the first and/or second primary surfaces 54, 56. The maximum flaw size can also be held to about 2.5 μm or less, 2 μm or less, 1.5 μm or less, 0.5 μm or less, 0.4 μm or less, or even smaller flaw size ranges. Reducing the flaw size in the compressive stress region of a glass cover element 50 can further reduce the propensity of the element 50 to fail by crack propagation upon the application of tensile stresses by virtue of bending forces to the foldable module 100a (see FIG. 4B). In addition, some aspects of the foldable device module 100a can include a surface region with a controlled flaw size distribution (e.g., flaw sizes of 0.5 μm or less at the first and/or second primary surfaces 54, 56) without employing one or more compressive stress regions.

Referring to FIGS. 1 and 4A, bending forces, $F_{bend}$, applied to the foldable electronic device module 100a can result in tensile stresses at the second primary surface 56 of the cover element 50, e.g. at point "T" shown in FIG. 4B, generally on or in close proximity to the central bend axis 210. Tighter (i.e., smaller) bending radii 220 lead to higher tensile stresses. Further, tighter bending radii 220 also require increasingly higher bending forces, $F_{bend}$, to bend or otherwise fold the module 100a to the desired radii 220. Equation (1) below can be used to estimate the maximum tensile stresses in the cover element 50, particularly at the second primary surface 56 of the cover element 50, subjected to bending with a constant bend radius 220. Equation (1) is given by:

$$\sigma_{max} = \frac{E}{1-v^2} \frac{h}{2} \frac{1}{R} \quad (1)$$

where E is the Young's modulus of the glass cover element 50, v is the Poisson's ratio of the cover element 50 (typically v is ~0.2-0.3 for most glass compositions), h is reflective of the thickness 52 of the cover element, and R is the bend radius of curvature (comparable to bend radius 220). Using Equation (1), it is apparent that maximum bending stresses are linearly dependent on the thickness 52 of the glass cover element 50 and elastic modulus, and inversely dependent on the bend radius 220 of curvature of the glass cover element 50.

The bending forces, $F_{bend}$, applied to the foldable module 100a and, particularly the cover element 50, could also result in the potential for crack propagation leading to instantaneous or slower, fatigue failure mechanisms within the element 50. The presence of flaws at the second primary surface 56, or slightly beneath the surface, of the element 50 can contribute to these potential failure modes. Using Equation (2) below, it is possible to estimate the stress intensity factor in a glass cover element 50 subjected to bending forces, $F_{bend}$. Equation (2) is given by:

$$K = Y\sigma\sqrt{\pi a} = \frac{YE}{1-v^2} \frac{h}{2} \frac{1}{R} \sqrt{\pi a} \quad (2)$$

where a is the flaw size, Y is a geometry factor (generally assumed to be 1.12 for cracks emanating from a glass edge, a typical failure mode), and a is the bending stress associated with the bending forces, $F_{bend}$, as estimated using Equation (1). Equation (2) assumes that the stress along the crack face is constant, which is a reasonable assumption when the flaw size is small (e.g., <1 μm). When the stress intensity factor K reaches the fracture toughness of the glass cover element 50, $K_{IC}$, instantaneous failure will occur. For most compositions suitable for use in glass cover element 50, $K_{IC}$ is ~0.7 MPa√m. Similarly, when K reaches a level at or above a fatigue threshold, $K_{threshold}$, failure can also occur via slow, cyclic fatigue loading conditions. A reasonable assumption for $K_{threshold}$ is ~0.2 MPa√m. However, $K_{threshold}$ can be experimentally determined and is dependent upon the overall application requirements (e.g., a higher fatigue life for a given application can increase $K_{threshold}$). In view of Equation (2), the stress intensity factor can be reduced by reducing the overall tensile stress level and/or the flaw size at the primary surfaces of the glass cover element 50, particularly at those surfaces likely subject to high tensile stresses upon bending.

According to some aspects of foldable electronic device module 100a, the tensile stress and stress intensity factor estimated through Equations (1) and (2) can be minimized through the control of the stress distribution at the second primary surface 56 of the glass cover element 50. In particular, a compressive stress profile (e.g., through one or more of the CTE-induced, ion-exchanged, and/or flex-bond residual compressive stress regions outlined in the foregoing paragraphs) at and below the second primary surface 56 is subtracted from the bending stress calculated in Equation (1). As such, overall bending stress levels are beneficially reduced which, in turn, also reduces the stress intensity factors that can be estimated through Equation (2).

Again referring to FIG. 1, other implementations of the foldable electronic device module 100a can include a cover element 50 comprising a glass material subjected to various etching processes that are tailored to reduce the flaw sizes and/or improve the flaw distribution within the element 50. These etching processes can be employed to control the flaw distributions within the cover element 50 in close proximity to its primary surfaces 54, 56, and/or along its edges (not shown). For example, an etching solution containing about 15 vol % HF and 15 vol % HCl can be employed to lightly etch the surfaces of a cover element 50 having a glass composition. The time and temperature of the light etching can be set, as understood by those with ordinary skill, according to the composition of the element 50 and the desired level of material removal from the surfaces of the cover element 50. It should also be understood that some surfaces of the element 50 can be left in an un-etched state by employing masking layers or the like to such surfaces during the etching procedure. More particularly, this light etching can beneficially improve the strength of the cover element 50. In particular, cutting or singling processes employed to section the glass structure that is ultimately employed as the cover element 50 can leave flaws and other defects within the surfaces of the element 50. These flaws and defects can propagate and cause glass breakage during the application of stresses to the module 100a containing the element 50 from the application environment and usage. The selective etching process, by virtue of lightly etching one or more edges of the element 50, can remove at least some of the flaws and defects, thereby increasing the strength and/or fracture resistance of the lightly-etched surfaces, e.g., as demonstrated in the foregoing paragraphs in view of Equation (1) and (2).

It should also be understood that the cover element 50 employed in the foldable module 100a depicted in FIG. 1 can include any one or more of the foregoing strength-enhancing features: (a) flex-bond residual stress region; (b) ion-exchanged compressive stress regions; (c) CTE-induced compressive stress regions; and (d) etched surfaces with smaller defect sizes. These strength-enhancing features can be used to offset or partially offset tensile stresses generated at the surfaces of the cover element 50 associated with the application environment, usage and processing of the foldable electronic device module 100a.

As outlined above, the foldable electronic device module 100a depicted in FIG. 1 includes an adhesive 10a with certain material properties (e.g., a shear modulus from about 0.1 MPa to 100 MPa). Example adhesives that can be employed as the adhesive 10a in the module 100a include optically clear adhesives ("OCAs") (e.g., Henkel Corporation LOCTITE® liquid OCAs), epoxies, and other joining materials as understood by those with ordinary skill in the field that are suitable to join the stack 90a to the second primary surface 56 of the cover element 50. In some aspects of the module 100a, the adhesive 10a will also possess a high thermal resistance such that its material properties experience little to no change upon being subjected to various temperatures (e.g., 500 hours at each −40° C. and about +85° C.), humidity and high temperature (e.g., 500 hours at +65° C. at 95% R.H.), and temperature gradients (e.g., 200 thermal shock cycles, each cycle given by one hour at −40° C. followed one hour at +85° C.) in the application environment, including those generated by friction from bending of the foldable electronic device module 100a. Further, the adhesive 10a may have high resistance to ultraviolet light exposure and high peel adhesion properties comparable to those exhibited by 3M Company Company 8211, 8212, 8213, 8214 and 8215 OCAs.

As also outlined above, the foldable electronic device module 100a depicted in FIG. 1 includes a panel 60 having a panel elastic modulus from about 300 MPa to about 10 GPa, for example, from 300 MPa to about 5000 MPa, from 300 MPa to about 2500 MPa, from 300 MPa to about 1000 MPa, from 300 MPa to about 750 MPa, from 300 MPa to about 500 MPa, from 500 MPa to about 5000 MPa, from 500 MPa to about 2500 MPa, from 500 MPa to about 1000 MPa, from 500 MPa to about 750 MPa, from 750 MPa to about 5000 MPa, from 750 MPa to about 2500 MPa, from 750 MPa to about 1000 MPa, from 1000 MPa to about 5000 MPa, from 1000 MPa to about 2500 MPa, and from 2500 MPa to about 5000 MPa. In some aspects, the panel elastic modulus of the panel 60 is about 350 MPa, 400 MPa, 450 MPa, 500 MPa, 550 MPa, 600 MPa, 650 MPa, 700 MPa, 750 MPa, 800 MPa, 850 MPa, 900 MPa, 950 MPa, 1000 MPa, 2 GPa, 3 GPa, 4 GPa, 5 GPa, 6 GPa, 7 GPa, 8 GPa, 9 GPa, 10 GPa, or any elastic modulus value between these values. Suitable materials that can be employed as the panel 60 in the module 100a include various thermoset and thermoplastic materials, e.g., polyimides, suitable for mounting electronic devices 102 and possessing high mechanical integrity and flexibility when subjected to the bending associated with the foldable electronic device module 100a. For example, panel 60 may be an organic light emitting diode ("OLED") display panel. The material selected for the panel 60 may also exhibit a high thermal stability to resist material property changes and/or degradation associated with the application environment for the module 100a and/or its processing conditions. The material selected for the panel 60 may also include glass, glass-ceramic, or ceramic materials.

In some implementations, the foldable electronic device module 100a depicted in FIG. 1 can be employed in a display, printed circuit board, housing or other features associated with an end product electronic device. For example, the foldable module 100a can be employed in an electronic display device containing numerous thin film transistors ("TFTs") or in an LCD or OLED device containing a low-temperature polysilicon ("LTPS") backplane. When the foldable module 100a is employed in a display, for example, the module 100a can be substantially transparent. Further, the module 100a can have pencil hardness, bend radius, puncture resistance and/or suitable bending force capabilities as described in the foregoing paragraphs. In one exemplary implementation, the foldable electronic device module 100a is employed in a wearable electronic device, for example, a watch, wallet or bracelet. As defined herein, "foldable" includes complete folding, partial folding, bending, flexing, discrete bends, and multiple-fold capabilities.

Figure 2:
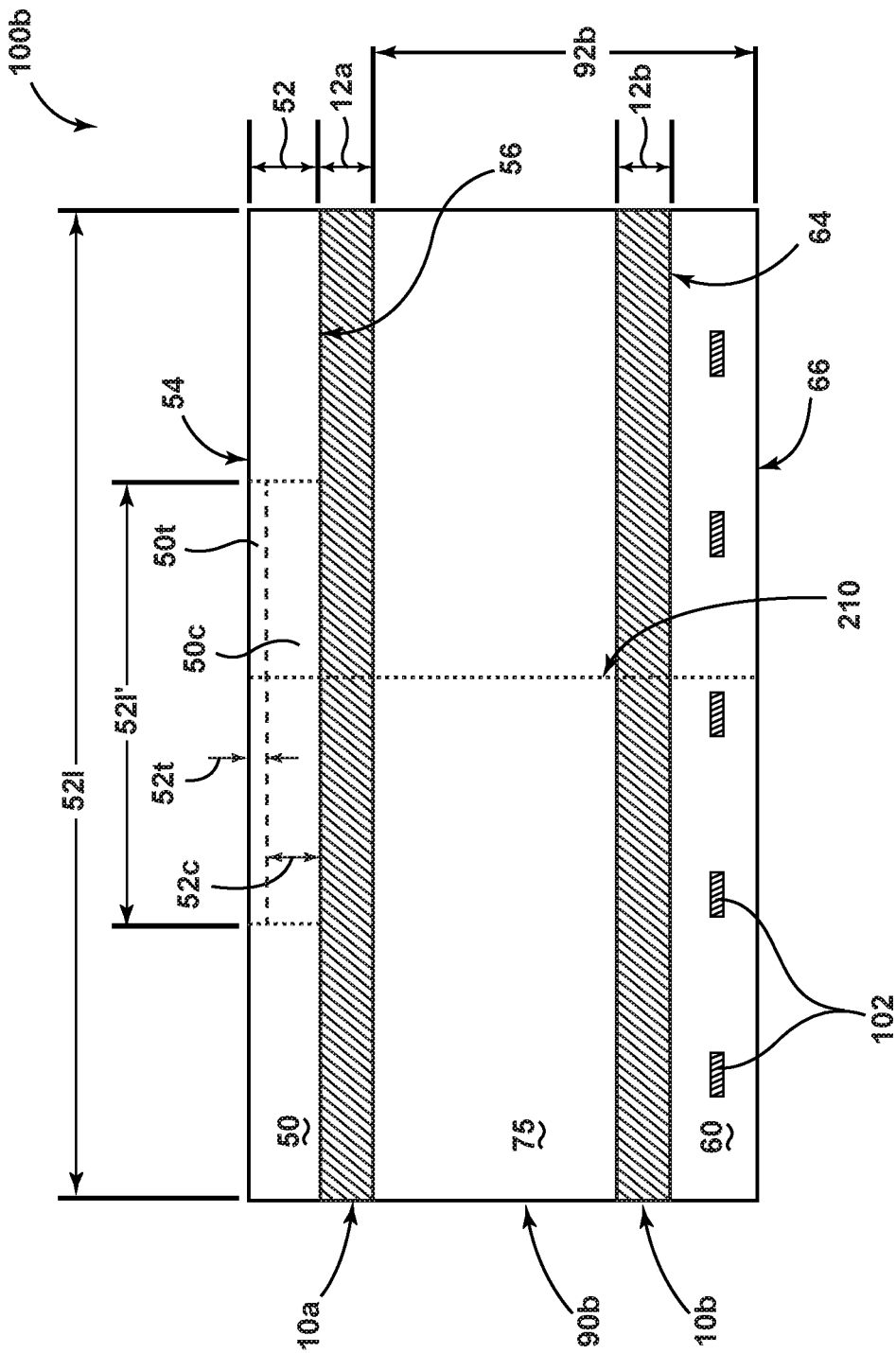
FIG. 2 is a cross-sectional view of a foldable electronic device module according to a further aspect of the disclosure.

Referring now to FIG. 2, a foldable electronic device module 100b is provided with many features in common with the foldable electronic device module 100a (see FIG. 1). Unless otherwise noted, any features in common between the modules 100a and 100b (i.e., with the same element numbers) have the same or similar construction, features and properties. For example, the foldable electronic device module 100b, like module 100a (see FIG. 1), can include a flex-bond residual stress region, denoted by the combination of 50c and 50t, within the central portion 52l' of the cover element 50. As noted earlier, the flex-bond residual stress region 50c, 50t exists through the thickness 52 of the cover element 50 within the central portion 52l', ranging from a maximum compressive stress at the second primary surface 56 and maximum tensile residual stress at the first primary surface 54 at the central bend axis 210. In certain aspects, the flex-bond residual stress region can be characterized by a compressive residual stress region component 50c with a thickness 52c and a tensile residual stress region component 50t with a thickness 52t. As also shown in FIG. 2, the module 100b includes a cover element 50 having a thickness from about 25 μm to about 200 μm and a cover element elastic modulus from about 20 GPa to about 140 GPa. The cover element 50 further includes a glass composition or a component having a glass composition, a first primary surface 54, and a second primary surface 56. In some embodiments of the foldable modules 100b having a flex-bond residual stress region 50c, 50t within the central portion 52l', the maximum compressive residual stress at the second primary surface 56 of the cover element 50 at the central bend axis 210 can reach up to 300 MPa, up to 275 MPa, up to 250 MPa, up to 225 MPa, up to 200 MPa, up to 175 MPa, up to 150 MPa, up to 125 MPa, up to 100 MPa, up to 75 MPa, up to 50 MPa, up to 40 MPa, up to 30 MPa, up to 20 MPa, up to 10 MPa, and all values between these maximum compressive stress levels at the second primary surface 56 of the cover element 50 (at the central bend axis 210).

The module 100b depicted in FIG. 2 further includes: a stack 90b having a thickness 92b from about 100 μm to about 600 μm; and a first adhesive 10a configured to join the stack element 75 to the second primary surface 56 of the cover element 50. In the module 100b, the first adhesive 10a is characterized by a shear modulus between about 0.01 MPa and about 1 GPa, for example, from about 0.01 MPa to about 800 MPa, from about 0.01 MPa to about 600 MPa, from about 0.01 MPa to about 400 MPa, from about 0.01 MPa to about 200 MPa, from about 0.01 MPa to about 1 MPa, from about 1 MPa to about 800 MPa, from about 1 MPa to about 600 MPa, from about 1 MPa to about 400 MPa, from about 1 MPa to about 200 MPa, from about 200 MPa to about 800 MPa, from about 200 MPa to about 600 MPa, from about 200 MPa to about 400 MPa, from about 400 MPa to about 800 MPa, from about 400 MPa to about 600 MPa, or from about 600 MPa to about 800 MPa.

In some aspects of the module 100b, the first adhesive 10a is characterized by a shear modulus of 0.01 MPa, 0.02 MPa, 0.03 MPa, 0.04 MPa, 0.05 MPa, 0.06 MPa, 0.07 MPa, 0.08 MPa, 0.09 MPa, 0.1 MPa, 0.2 MPa, 0.3 MPa, 0.4 MPa, 0.5 MPa, 0.6 MPa, 0.7 MPa, 0.8 MPa, 0.9 MPa, 1 MPa, 5 MPa, 10 MPa, 20 MPa, 30 MPa, 40 MPa, 50 MPa, 60 MPa, 70 MPa, 80 MPa, 90 MPa, 100 MPa, 200 MPa, 300 MPa, 400 MPa, 500 MPa, 600 MPa, 700 MPa, 800 MPa, 900 MPa, 1000 MPa, or any amount between these shear modulus values. Aspects of the foldable module 100b can incorporate an adhesive 10a with a relatively higher shear modulus, e.g., from about 1 MPa to about 1000 MPa (i.e., 1 GPa), compared to the shear modulus of conventional adhesives typically employed in such electronic device applications. The use of such adhesives 10a with relatively higher shear modulus values unexpectedly provides a significant decrease in tensile stresses observed at the second primary surface 56 of the cover element 50 upon bending the foldable electronic device module 100b in a direction away from the second primary surface 56—i.e., by bending the module 100b such that the second primary surface 56 exhibits a convex shape.

Still referring to FIG. 2, certain aspects of the foldable module 100b can be configured to minimize bending forces associated with bending the entire module by controlling the shear modulus of one or more of the adhesives employed within the module 100b. More particularly, the use of a first adhesive 10a with a relatively low shear modulus value (e.g., from about 0.01 MPa to about 0.1 MPa) can reduce the overall bending force required to fold or otherwise bend the entire module 100b in an upward or downward direction such that the first primary surface 54 exhibits a concave or convex shape, respectively. These bending force reductions associated with certain aspects of the foldable module 100b through the use of a first adhesive 10a with a relatively low elastic shear modulus value are obtained relative to a foldable module (e.g., foldable module 100b) with an adhesive between the cover element and the stack (e.g., first adhesive 10a) having a shear modulus that exceeds 0.1 MPa.

Figure 3:
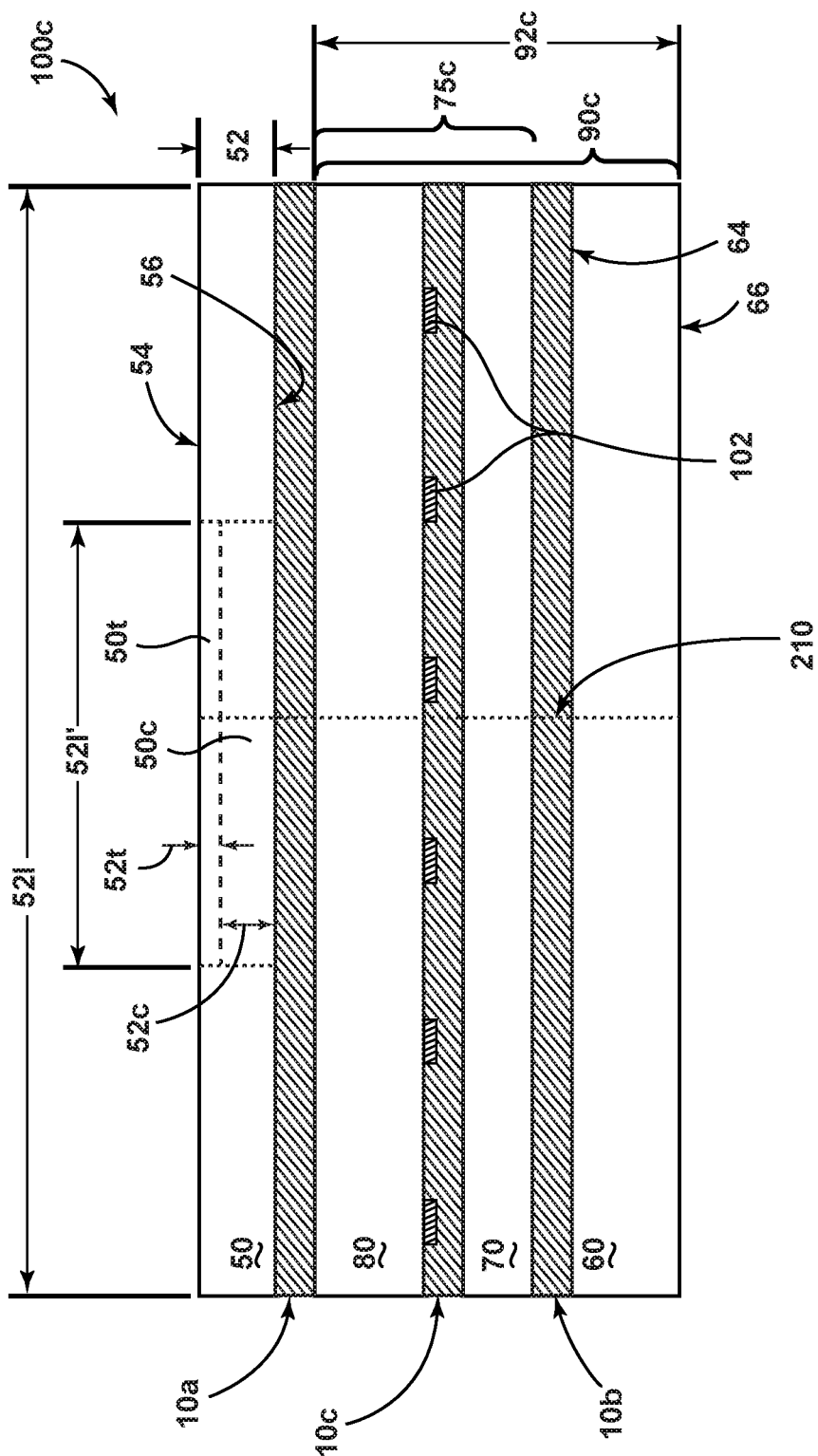
FIG. 3 is a cross-sectional view of a foldable electronic device module according to an additional aspect of the disclosure.

Referring again to the foldable electronic device module 100b depicted in FIG. 2, the stack 90b further includes a panel 60 having first and second primary surfaces 64, 66, and a panel elastic modulus from about 300 MPa to 10 GPa. The stack 90b also includes one or more electronic devices 102 coupled to or within the panel 60, and a stack element 75 having a stack element elastic modulus from about 1 GPa to about 5 GPa, with the stack element being affixed to the panel 60 with a stack adhesive 10b. As outlined earlier in connection with the module 100a (see FIG. 1), the stack element 75 can include various components, including but not limited to a touch sensor, polarizer, touch sensor components (e.g., electrode layers), thin film transistors, driving circuits, sources, drains, doped regions, and other electronic device and electronic device components, other adhesives, and joining materials. Collectively, these features possess an elastic modulus between about 1 GPa and about 10 GPa within the foldable electronic device module 100b. It should also be understood that the relationship between the panel 60, stack element 75 and electronic devices 102 (e.g., as located within the panel 60) is depicted schematically in FIG. 2. Depending on the application for the device module 100b, these elements may have different orientations with regard to one another. For example, panel 60 can be an LCD panel or an OLED display in which the electronic devices 102 are sandwiched within the panel 60 (e.g., as shown schematically in FIG. 2) by two glass layers (not shown), or a polymeric substrate encapsulated by a glass sealing layer, for instance. In another example, as schematically shown in FIG. 3 and discussed further below, the electronic devices 102 can be aspects of a touch sensor (e.g., electronic trace lines in a transparent conductor, for example, indium tin oxide, silver nanowires, etc.) located at a higher vertical position within the stack 75, above the panel 60 and stack adhesive 10b.

With regard to the stack adhesive 10b employed in the foldable electronic device module 100b, its composition can be selected to join the stack element 75 to the panel 60 with a bond strength suitable for the application employing the module 100b. According to some implementations of the foldable modules 100b of the second aspect of the disclosure, the stack adhesive 10b is characterized by a shear modulus from about 10 kPa to about 100 kPa, for example, from about 10 kPa to about 90 kPa, from about 10 kPa to about 80 kPa, from about 10 kPa to about 70 kPa, from about 10 kPa to about 60 kPa, from about 10 kPa to about 50 kPa, from about 10 kPa to about 40 kPa, from about 10 kPa to about 30 kPa, from about 10 kPa to about 30 kPa, from about 20 kPa to about 90 kPa, from about 20 kPa to about 80 kPa, from about 20 kPa to about 70 kPa, from about 20 kPa to about 60 kPa, from about 20 kPa to about 50 kPa, from about 20 kPa to about 40 kPa, from about 20 kPa to about 30 kPa, from about 30 kPa to about 90 kPa, from about 30 kPa to about 80 kPa, from about 30 kPa to about 70 kPa, from about 30 kPa to about 60 kPa, from about 30 kPa to about 50 kPa, from about 30 kPa to about 40 kPa, from about 40 kPa to about 90 kPa, from about 40 kPa to about 80 kPa, from about 40 kPa to about 70 kPa, from about 40 kPa to about 60 kPa, from about 40 kPa to about 50 kPa, from about 50 kPa to about 90 kPa, from about 50 kPa to about 80 kPa, from about 50 kPa to about 70 kPa, from about 50 kPa to about 60 kPa, from about 60 kPa to about 90 kPa, from about 60 kPa to about 80 kPa, from about 60 kPa to about 70 kPa, from about 70 kPa to about 90 kPa, from about 70 kPa to about 80 kPa, or from about 80 kPa to about 90 kPa. In this aspect, the stack adhesive 10b may also be characterized by a shear modulus of about 10 kPa, 20 kPa, 25 kPa, 30 kPa, 35 kPa, 40 kPa, 45 kPa, 50 kPa, 55 kPa, 60 kPa, 65 kPa, 70 kPa, 75 kPa, 80 kPa, 85 kPa, 90 kPa, 95 kPa, 100 kPa, or any shear modulus value between these values. Aspects of the foldable modules 100*b* incorporate a stack adhesive 10*b* with a relatively lower shear modulus, e.g., from about 10 kPa to about 100 kPa, as compared to the shear modulus of at least some conventional adhesives typically employed in electronic device applications according to the general field of disclosure. The use of such adhesives 10*b* with relatively lower shear modulus values unexpectedly provides a significant decrease in tensile stresses observed at the first primary surface 64 of the panel 60 upon bending the foldable electronic device module 100*b* in a direction away from the second primary surface 66—i.e., by bending the module 100*b* such that the second primary surface 66 exhibits a convex shape. In contrast, those in the field facing the same concerns and lacking the benefit of this disclosure would have typically not appreciated that the material properties of the stack adhesive 10*b*, as compared to the material properties of the larger aspects of the module (i.e., the cover element 50, the panel 60, the stack element 75), could play such a significant role in the magnitude of the tensile stresses at the first primary surface 64 of the panel 60. As also noted earlier, this aspect unexpectedly provides a significant decrease in tensile stresses at the first primary surface 54 given that less rigid or lower modulus adhesives would often be incorporated into device modules to provide improved mechanical reliability.

Referring again to FIG. 2, certain aspects of the foldable module 100*b* can be configured to minimize bending forces associated with bending the entire module by controlling the shear modulus of one or more of the adhesives employed within the module 100*b*. For example, the use of stack adhesive 10*b* with a relatively low shear modulus value (e.g., from about 0.01 MPa to about 0.1 MPa) can unexpectedly reduce the overall bending force required to fold or otherwise bend the entire module 100*b* in an upward or downward direction such that the first primary surface 54 exhibits a concave or convex shape, respectively. Moreover, other aspects of the foldable module 100*b* can be configured to minimize bending forces associated with bending the entire module by controlling the shear modulus of the first adhesive 10*a* and the shear modulus of the stack adhesive 10*b* (e.g., both adhesives having a shear modulus from about 0.01 MPa to about 0.1 MPa). These bending force reductions associated with certain aspects of the foldable module 100*b* through the use of a first adhesive 10*a* and/or a stack adhesive 10*b* with a relatively low elastic shear modulus value are obtained relative to a foldable module (e.g., foldable module 100*b*) with one or more adhesives (e.g., adhesives 10*a*, 10*b*) having a shear modulus that exceeds 0.1 MPa.

According to other implementations of the foldable modules 100*b* (see FIG. 2) of the second aspect of the disclosure, the stack adhesive 10*b* is characterized by a thickness 12*b* from about 5 μm to about 60 μm, for example, from about 5 μm to about 50 μm, from about 5 μm to about 40 μm, from about 5 μm to about 30 μm, from about 5 μm to about 20 μm, from about 5 μm to about 15 μm, from about 5 μm to about 10 μm, from about 10 μm to about 60 μm, from about 15 μm to about 60 μm, from about 20 μm to about 60 μm, from about 30 μm to about 60 μm, from about 40 μm to about 60 μm, from about 50 μm to about 60 μm, from about 55 μm to about 60 μm, from about 10 μm to about 50 μm, from about 10 μm to about 40 μm, from about 10 μm to about 30 μm, from about 10 μm to about 20 μm, from about 10 μm to about 15 μm, from about 20 μm to about 50 μm, from about 30 μm to about 50 μm, from about 40 μm to about 50 μm, from about 20 μm to about 40 μm, and from about 20 μm to about 30 μm. Other embodiments have a stack adhesive 10*b* characterized by a thickness 12*b* of about 5 μm, 10 μm, 15 μm, 20 μm, 25 μm, 30 μm, 35 μm, 40 μm, 45 μm, 50 μm, 55 μm, 60 μm, or any thickness between these thickness values. In one aspect, the thickness 12*b* of the stack adhesive 10*b* is from about 30 μm to about 60 μm. The use of such adhesives 10*b* with relatively higher thickness values provides a significant decrease in tensile stresses observed at the first primary surface 64 of the panel 60 upon bending the foldable electronic device module 100*b* in a direction away from the second primary surface 66 of the panel. In contrast, those in the field facing the same concerns and lacking the benefit of this disclosure would have typically not appreciated that the thickness of a relatively thin adhesive, as compared to the overall thickness of the module, could play such a significant role in the magnitude of the tensile stresses at the first primary surface 64 of the panel 60. In addition, while it is believed that further increases in the thickness 12*b* of the adhesive 10*b* will result in additional reductions in tensile stresses observed at the first primary surface 64 of the panel 60, the thickness 12*b* can be limited by application requirements aimed at minimizing the overall thickness 92*b* of the stack 90*b*.

Still referring to FIG. 2, certain aspects of the foldable module 100*b* can be configured to minimize bending forces associated with bending the entire module by controlling the thickness of the first adhesive 10*a* and/or the stack adhesive 10*b*. More particularly, the use of a first adhesive 10*a* with a range of thicknesses 12*a* (e.g., from about 10 μm to about 40 μm) and/or the stack adhesive 10*b* with a range of thicknesses 12*b* (e.g., from about 10 μm to 40 μm) can reduce the overall bending force required to fold or otherwise bend the entire module 100*b* in an upward or downward direction such that the first primary surface 54 exhibits a concave or convex shape, respectively. These bending force reductions associated with certain aspects of the foldable module 100*b* through the use of a first adhesive 10*a* and/or a stack adhesive 10*b* within a prescribed range of thicknesses are obtained relative to a foldable module (e.g., foldable module 100*b*) with one or more adhesives (e.g., first adhesive 10*a* and/or a stack adhesive 10*b*) having a relatively small thickness (e.g. less than 10 μm) or a relatively large thickness (e.g., more than 40 μm).

Referring again to FIG. 2, the foldable electronic device module 100*b*, according to another implementation, can be characterized by a bending force ($F_{bend}$) of no greater than 150 Newtons (N) as the module is bent inward by a test apparatus to a bend radius 220, the bend radius being approximately half the distance (D) between two test plates 250 (see FIGS. 4A & 4B). In certain implementations, the bending force is no greater than about 150 N, 140 N, 130 N, 120 N, 110 N, 100 N, 90 N, 80 N, 70 N, 60 N, 50 N, 40 N, 30 N, 20 N, 10 N, 5 N, or any amount between these bending force upper limits, upon bending of the module to a radius from about 20 mm to about 3 mm (i.e., a plate distance (D) of about 40 to about 6 mm), for example, 20 mm, 19.75 mm, 19.5 mm, 19.25 mm, 19 mm, 18.5 mm, 17.5 mm, 17 mm, 16.5 mm, 16 mm, 15.5 mm, 15 mm, 14.5 mm, 14 mm, 13.5 mm, and 13 mm, 12.5 mm, 12 mm, 11.5 mm, 11 mm, 10.5 mm, 10 mm, 9.5 mm, 9 mm, 8.5 mm, 7.5 mm, 7 mm, 6.5 mm, 6 mm, 5.5 mm, 5 mm, 4.5 mm, 4 mm, 3.5 mm, 3.25 mm and 3 mm. As outlined earlier, these relatively low bending forces can be obtained in the foldable electronic device module 100*b* through tailoring of the material properties and/or thicknesses of the first adhesive 10*a* and/or the stack adhesive 10*b*.

In some embodiments of the foldable module 100*b* depicted in FIG. 2, the stack adhesive 10*b* is further characterized by a Poisson's ratio from about 0.1 to about 0.5, for example, from about 0.1 to about 0.45, from about 0.1 to about 0.4, from about 0.1 to about 0.35, from about 0.1 to about 0.3, from about 0.1 to about 0.25, from about 0.1 to about 0.2, from about 0.1 to about 0.15, from about 0.2 to about 0.45, from about 0.2 to about 0.4, from about 0.2 to about 0.35, from about 0.2 to about 0.3, from about 0.2 to about 0.25, from about 0.25 to about 0.45, from about 0.25 to about 0.4, from about 0.25 to about 0.35, from about 0.25 to about 0.3, from about 0.3 to about 0.45, from about 0.3 to about 0.4, from about 0.3 to about 0.35, from about 0.35 to about 0.45, from about 0.35 to about 0.4, or from about 0.4 to about 0.45. Other embodiments include a stack adhesive 10*b* characterized by a Poisson's ratio of about 0.1, 0.15, 0.2, 0.25, 0.3, 0.35, 0.4, 0.45, 0.5, or any Poisson's ratio between these values. In one aspect, the Poisson's ratio of the stack adhesive 10*b* is from about 0.4 to about 0.5.

As outlined above, the foldable electronic device module 100*b* depicted in FIG. 2 can include a stack adhesive 10*b* with certain material properties (e.g., a shear modulus from about 10 kPa to about 100 kPa). Example adhesives that can be employed as the stack adhesive 10*b* in the module 100*b* are generally the same or similar to those suitable for the first adhesive 10*a*. Thus, the stack adhesive 10*b* can include OCAs, epoxies, and other joining materials as understood by those with ordinary skill in the field that are suitable to join the stack element 75 to the first primary surface 64 of the panel 60. In some aspects of the module 100*b*, the stack adhesive 10*b* will also possess a high thermal resistance such that its material properties experience little to no change upon being subjected to various temperatures and temperature gradients in the application environment, including those generated by friction from bending of the foldable electronic device module 100*b*.

Referring again to FIG. 2, the cover element 50 of the foldable electronic device module 100*b* is further characterized by a puncture resistance of at least 1.5 kgf when the first primary surface 54 of the cover element is loaded with a tungsten carbide ball having a diameter of 1.5 mm. Further, the device module 100*b* is characterized by a tangential stress at the second primary surface 56 of the cover element 50 of no greater than about 1000 MPa in tension upon bending the module in a two-point configuration to a bend radius from about 20 mm to about 1 mm such that the first primary surface 54 is in compression and the bend radius is measured from a center point above the first primary surface 54 of the cover element 50 to the second primary surface 66 of the panel 60 (see FIG. 4B). These performance characteristics associated with the foldable electronic device module 100*b* (FIG. 2) are comparable to those demonstrated by the foldable electronic device module 100*a* (FIG. 1). More particularly, these reduced tensile stress levels at the second primary surface 56 of the cover element 50 are achieved through the development of a flex-bond residual stress region in the cover element, tailoring of the material properties of the first adhesive 10*a* (e.g., shear modulus and/or Poisson's ratio) and/or the thickness 12*a* of the first adhesive 10*a* and/or the presence of one or more other compressive stress regions (i.e., flex-bond residual, CTE-induced and/or ion-exchanged compressive stress region(s)). Thus, some aspects of the disclosure provide a foldable electronic device module with improved mechanical reliability, particularly at its cover element, through the control of the material properties and/or thickness of the adhesive joining the cover element to the stack within the module in addition to the use of the process conditions and concepts of the disclosure to develop one or more compressive stress regions.

Referring to FIG. 3, a foldable electronic device module 100*c* is provided with most of its features in common with the foldable electronic device module 100*b* (see FIG. 2), including performance characteristics (i.e., high puncture resistance and minimal tangential stresses (in tension) at the second primary surface of the cover element). Unless otherwise noted, any features in common between the modules 100*b* and 100*c* (i.e., with the same element numbers) have the same or similar construction, features and properties. As shown in FIG. 3, the module 100*c* also includes a cover element 50 having a thickness 52 from about 25 μm to about 200 μm and a cover element elastic modulus from about 20 GPa to about 140 GPa.

The module 100*c* depicted in FIG. 3 further includes: a stack 90*c* having a thickness 92*c* from about 100 μm to about 600 μm; and a first adhesive 10*a* configured to join the stack element 75*c* to the second primary surface 56 of the cover element 50. The stack 90*c* further includes a panel 60 having first and second primary surfaces 64, 66, and a panel elastic modulus from about 300 MPa to about 10 GPa. The stack 90*c* also includes one or more electronic devices 102 (e.g., touch sensor electrode lines, and other electronic device and electronic device components) coupled to the panel 60 or touch sensor 80 (e.g., as shown schematically in FIG. 3), and a stack element 75*c* having a stack element elastic modulus from about 1 GPa to about 5 GPa, with the stack element being affixed to the panel 60 with a stack adhesive 10*b*. It should also be understood that the relationship between the panel 60, stack element 75*c* and electronic devices 102 (e.g., as coupled to the touch sensor 80 depicted in FIG. 3) is depicted in exemplary, schematic form in FIG. 3. Depending on the application for the device module 100*c*, these elements may have different orientations with regard to one another. For example, panel 60 can be an LCD panel or an OLED display in which the electronic devices 102 are sandwiched within the panel 60 by two glass layers, or a polymeric substrate encapsulated by a glass sealing layer, for instance. See FIG. 2. In another example (as depicted in FIG. 3), the electronic devices 102 can be aspects of a touch sensor (e.g., electronic trace lines in a transparent conductor, for example, indium tin oxide, silver nanowires, etc.) located at a higher vertical position within the stack 75*c*, above the panel 60 and stack adhesive 10*b*, and coupled to the sensor 80. Depending on the application for the module 100*c*, it is also envisioned that some electronic devices 102 could be located within or on panel 60 and others coupled to touch sensor 80.

In some aspects of the module 100*c* depicted in FIG. 3, the stack element 75*c* exhibits a stack element elastic modulus from about 1 GPa to about 5 GPa, for example, from about 1 GPa to about 4.5 GPa, from about 1 GPa to about 4 GPa, from about 1 GPa to about 3.5 GPa, from about 1 GPa to about 3 GPa, from about 1 GPa to about 2.5 GPa, from about 1 GPa to about 2 GPa, from about 1 GPa to about 1.5 GPa, from about 1.5 GPa to about 4.5 GPa, from about 1.5 GPa to about 4 GPa, from about 1.5 GPa to about 3.5 GPa, from about 1.5 GPa to about 3 GPa, from about 1.5 GPa to about 2.5 GPa, from about 1.5 GPa to about 2 GPa, from about 2 GPa to about 4.5 GPa, from about 2 GPa to about 4 GPa, from about 2 GPa to about 3.5 GPa, from about 2 GPa to about 3 GPa, from about 2 GPa to about 2.5 GPa, from about 2.5 GPa to about 4.5 GPa, from about 2.5 GPa to about 4 GPa, from about 2.5 GPa to about 3.5 GPa, from about 2.5 GPa to about 3 GPa, from about 3 GPa to about 4.5 GPa, from about 3 GPa to about 4 GPa, from about 3

GPa to about 3.5 GPa, from about 3.5 GPa to about 4.5 GPa, from about 3.5 GPa to about 4 GPa, or from about 4 GPa to about 4.5 GPa.

In the foldable electronic device module 100c depicted in FIG. 3, the stack element 75c includes a touch sensor 80, a polarizer 70, and an adhesive 10c that joins the touch sensor 80 to the polarizer 70. In general, the composition and thickness of the adhesive 10c is comparable to those employed in the first adhesive 10a and the stack adhesive 10b. To the extent that the adhesives 10a and 10b possess different material properties and/or thicknesses, the adhesive 10c can be selected to match the properties and/or thicknesses of the first adhesive 10a or stack adhesive 10b.

According to some embodiments of the disclosure, the foldable electronic device module 100c depicted in FIG. 3, like modules 100a (see FIG. 1) and 100b (see FIG. 2), can include a flex-bond residual stress region, denoted by the combination of 50c and 50t, within the central portion 52l' of the cover element 50. As noted earlier, the residual stress region 50c, 50t exists through the thickness 52 of the cover element 50 within the central portion 52l', ranging from a maximum compressive stress at the second primary surface 56 and maximum tensile residual stress at the first primary surface 54 at the central bend axis 210. In certain aspects, the flex-bond residual stress region can be characterized by compressive residual stress region component 50c with a thickness 52c and a tensile residual stress region component 50t with a thickness 52t. As also shown in FIG. 3, the module 100c includes a cover element 50 having a thickness from about 25 μm to about 200 μm and a cover element elastic modulus from about 20 GPa to about 140 GPa. The cover element 50 further includes a glass composition or a component having a glass composition, a first primary surface 54, and a second primary surface 56. In some embodiments of the foldable modules 100c having a flex-bond residual stress region 50c, 50t within the central portion 52l', the maximum compressive residual stress at the second primary surface 56 of the cover element 50 at the central bend axis 210 can reach up to 300 MPa, up to 275 MPa, up to 250 MPa, up to 225 MPa, up to 200 MPa, up to 175 MPa, up to 150 MPa, up to 125 MPa, up to 100 MPa, up to 75 MPa, up to 50 MPa, up to 40 MPa, up to 30 MPa, up to 20 MPa, up to 10 MPa, and all values between these maximum compressive stress levels at the second primary surface 56 of the cover element 50 (at the central bend axis 210).

Still referring to FIG. 3, certain aspects of the foldable module 100c can also be configured to minimize bending forces associated with bending the entire module by controlling the shear modulus of one or more of the adhesives employed within the module 100c. More particularly, the use of a first adhesive 10a, stack adhesive 10b and/or an adhesive 10c with a relatively lower shear modulus value (e.g., 0.01 MPa to 0.1 MPa) can unexpectedly reduce the overall bending force required to fold or otherwise bend the entire module 100c in an upward or downward direction such that the first primary surface 54 exhibits a concave or convex shape, respectively. In contrast, those in the field facing the same concerns and lacking the benefit of this disclosure would have typically not appreciated that the shear modulus of relatively thin adhesives, as compared to the shear modulus of other, much larger aspects of the module, could play such a significant role in the magnitude of the bending force required to fold or otherwise bend the module in an upward or downward direction. These bending force reductions associated with certain aspects of the foldable module 100c through the use of a first adhesive 10a, stack adhesive 10b and/or adhesive 10c with a relatively low elastic shear modulus value are obtained relative to a foldable module (e.g., foldable module 100c) with one or more adhesives (e.g., adhesives 10a, 10b and 10c) having a shear modulus that exceeds 0.1 MPa. Further, certain aspects of the foldable module 100c can be configured to minimize bending forces associated with bending the entire module by controlling the thickness of the first adhesive 10a, stack adhesive 10b and/or adhesive 10c. More particularly, the use of a first adhesive 10a with a range of thicknesses 12a (e.g., from about 10 μm to about 40 μm), stack adhesive 10b with a range of thicknesses 12b (e.g., from about 10 μm to about 40 μm) and/or adhesive 10c with a range of thicknesses (e.g., from about 10 μm to 40 μm) can reduce the overall bending force required to fold or otherwise bend the entire module 100c in an upward or downward direction such that the first primary surface 54 exhibits a concave or convex shape, respectively. In contrast, those in the field facing the same concerns and lacking the benefit of this disclosure would have typically not appreciated that the thickness of these relatively thin adhesives, as compared to the overall thickness of the module, could play such a significant role in the magnitude of the bending force required to fold or otherwise bend the module in an upward or downward direction. These bending force reductions associated with certain aspects of the foldable module 100c through the use of a first adhesive 10a, stack adhesive 10b and/or adhesive 10c within a prescribed range of thicknesses are obtained relative to a foldable module (e.g., foldable module 100c) with one or more adhesives (e.g., first adhesive 10a, stack adhesive 10b and/or adhesive 10c) having a relatively small thickness (e.g. less than 10 μm) or a relatively large thickness (e.g., more than 40 μm).

Referring again to FIG. 3, the foldable electronic device module 100c can be characterized by a bending force ($F_{bend}$) of no greater than 150 Newtons (N) as the module is bent inward by a test apparatus to a bend radius 220, the bend radius being approximately half the distance (D) between two test plates 250 (see FIGS. 4A & 4B). In certain implementations, the bending force is no greater than about 150 N, 140 N, 130 N, 120 N, 110 N, 100 N, 90 N, 80 N, 70 N, 60 N, 50 N, 40 N, 30 N, 20 N, 10 N, 5 N, or any amount between these bending force upper limits, upon bending of the module to a radius from about 20 mm to about 3 mm (i.e., a plate distance (D) of about 40 to about 6 mm), for example, 20 mm, 19.75 mm, 19.5 mm, 19.25 mm, 19 mm, 18.5 mm, 17.5 mm, 17 mm, 16.5 mm, 16 mm, 15.5 mm, 15 mm, 14.5 mm, 14 mm, 13.5 mm, and 13 mm, 12.5 mm, 12 mm, 11.5 mm, 11 mm, 10.5 mm, 10 mm, 9.5 mm, 9 mm, 8.5 mm, 7.5 mm, 7 mm, 6.5 mm, 6 mm, 5.5 mm, 5 mm, 4.5 mm, 4 mm, 3.5 mm, 3.25 mm or 3 mm. As outlined earlier, these relatively low bending forces can be obtained in the foldable electronic device module 100c through tailoring of the material properties and/or thicknesses of the first adhesive 10a, stack adhesive 10b and/or adhesive 10c.

As also depicted in FIG. 3, the foldable electronic device module 100c containing three adhesives and multiple layers exhibits performance characteristics comparable to those demonstrated by the foldable modules 100a and 100b (see FIGS. 1 and 2). In particular, reduced tensile stress levels at the second primary surface 56 of the cover element 50 are achieved through the development of a flex-bond residual stress region in the cover element, tailoring of the material properties of the first adhesive 10a (e.g., shear modulus and/or Poisson's ratio) and/or the thickness 12a (see FIG. 2) of the first adhesive 10a and/or the presence of one or more other compressive stress regions (i.e., flex-bond residual, CTE-induced and/or ion-exchanged compressive stress region(s)). In general, the disclosure provides a foldable electronic device module 100c with improved mechanical reliability, particularly at its cover element through the control of the material properties and/or thickness of the adhesive joining the cover element to the stack within the module in addition to the use of the process conditions and concepts of the disclosure to develop one or more compressive stress regions. The foldable electronic device module 100c also demonstrates high mechanical reliability indicative of low tensile stresses at the first primary surface 64 of the panel 60 through the control of the material properties and/or thickness of the stack adhesive 10b joining the panel to the stack element 75c.

Referring to FIGS. 4A & 4B, the foldable electronic device modules 100a-c (see FIGS. 1-3) are depicted in an un-bent (or substantially un-bent) and a bent configuration, respectively, within a two-point test apparatus 200 according to an aspect of the disclosure. It should be understood that some of the features associated with the foldable electronic device modules 100a-c are not depicted in FIGS. 4A and 4B for purposes of clarity.

In FIG. 4A, the modules 100a-c are depicted in an un-bent configuration within the two-point test apparatus 200 (see FIG. 4B, showing the test apparatus 200). Two vertical plates 250 are pressed inward against the module 100a, 100b or 100c during a bending test with a constant force, $F_{bend}$. Fixtures (not shown) associated with the test apparatus 200 ensure that the modules are bent in an upward direction generally about the central bend axis 210 as the $F_{bend}$ forces are applied to the modules via the plates 250. For example, although only a cover element 50 and panel 60 are shown, the modules may actually include other elements therebetween as in the modules of 100a, 100b and 100c.

Referring to FIG. 4B, the plates 250 are moved together in unison until a particular bend radius 220 is achieved. In general, the bend radius 220 is about half the distance, D, between the plates 250. As outlined earlier, the foldable electronic device modules 100a-c are characterized by a tangential stress at the second primary surface 56 (see FIGS. 1-3) of the cover element 50 of no greater than 1000 MPa in tension (i.e., at point "T") upon bending the module in a two-point apparatus 200 to a bend radius 220 about the central bend axis 210 from about 20 mm to about 1 mm such that the first primary surface 54 is in compression (i.e., at point "C"). As shown in FIG. 4B, the bend radius 220 is measured from a center point above the first primary surface 54 of the cover element 50 to the second primary surface 66 of the panel 60. This center point is located on the central bend axis 210 associated with the modules 100a-c. In certain implementations, the tangential stress (in tension) at the second primary surface 56 (see FIGS. 1-3) of the cover element 50 is no greater than about 1000 MPa, 950 MPa, 925 MPa, 900 MPa, 875 MPa, 850 MPa, 825 MPa, 800 MPa, 775 MPa, 750 MPa, 725 MPa, 700 MPa, or any amount between these tangential stress limits (in tension). Further, in other implementations of the disclosure, the modules 100a, 100b and 100c, can be characterized by a bending force ($F_{bend}$) of no greater than 150 Newtons (N) as the module is bent inward by the test apparatus 220 employing plates 250 (see FIGS. 4A & 4B). In certain implementations, the bending force is no greater than about 150 N, 140 N, 130 N, 120 N, 110 N, 100 N, 90 N, 80 N, 70 N, 60 N, 50 N, 40 N, 30 N, 20 N, 10 N, 5 N, or any amount between these bending force upper limits, upon bending of the module to a radius from about 20 mm to about 3 mm (i.e., a plate distance (D) of about 40 to about 6 mm).

Figure 5:
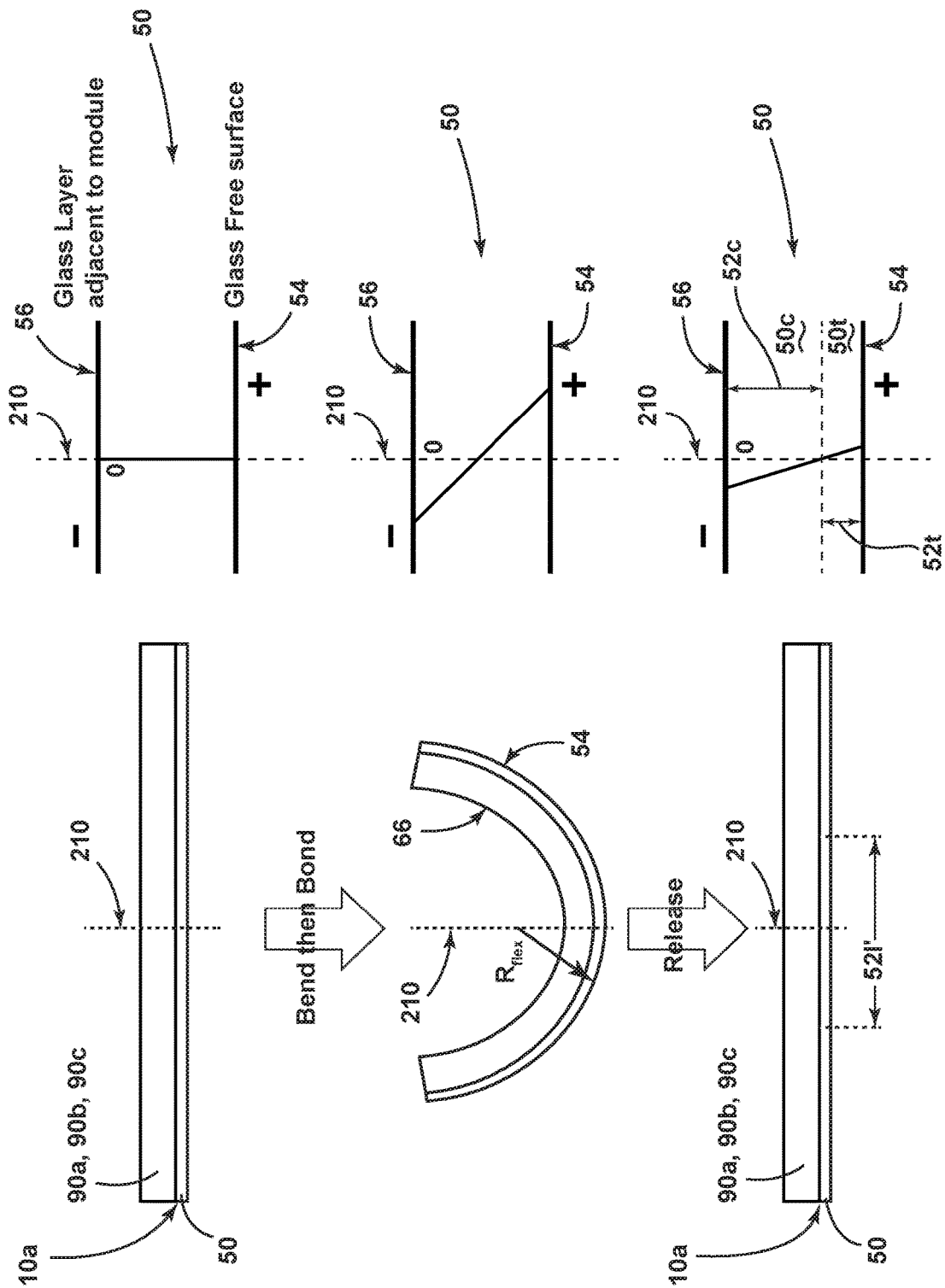
FIG. 5 depicts stages of a flex-bond method to fabricate a foldable electronic device module, along with corresponding stress states in the cover element, according to an aspect of the disclosure.

Referring to FIG. 5, the development of a flex-bond residual stress region in a cover element 50 (e.g., as employed in foldable modules 100a-c) is depicted. As shown in the left-hand portion of FIG. 5, a cover element 50 is disposed adjacent to a stack 90a, 90b, 90c (e.g., as employed in foldable modules 100a-c) with a first adhesive 10a therebetween to define a stacked module (as shown in FIG. 5 before the "Bend then Bond" step). At this stage, the adhesive 10a in the stacked module is not yet cured so that as the stack 90 and cover 50 are bent, they may slide relative to one another. The cover element 50 is characterized by a thickness 52 from about 25 µm to about 200 µm (not shown), a cover element elastic modulus from about 20 GPa to about 140 GPa, a glass composition and first and second primary surfaces 54, 56. The stack is characterized by a thickness 92a, 92b, 92c (see FIGS. 1-3) from about 50 µm to about 600 µm, and includes a panel 60 (see FIGS. 1-3) having first and second primary surfaces 64, 66 and a panel elastic modulus between about 300 MPa and about 10 GPa. Note that, in certain aspects of the disclosure, the thickness 92a, 92b, 92c can be as low as about 10 µm. The first adhesive 10a is characterized by a shear modulus between about 0.01 MPa and about 1 GPa and a glass transition temperature of at least 80° C. The method for developing the flex-bond residual stress region 50c, 50t also includes a step of bending the stacked module to a flex radius, $R_{flex}$, to define a flexed module (see FIG. 5, between the "Bend then Bond" and "Release" arrows). As shown in FIG. 5, $R_{flex}$ is measured from above the stack 90a, 90b, 90c to the first primary surface 54 of the cover element 50. The flex-bond method next includes a step of curing the first adhesive 10a in the flexed module at the flex radius, $R_{flex}$, to define a flex-bonded module. That is, the first adhesive 10a is cured while the module is in a flexed position at the flex radius, $R_{flex}$. A subsequent step in the flex-bond method is to return the flex-bonded module to an un-bent configuration (or substantially un-bent configuration) to provide the foldable electronic device module 100a-100c with the flex-bond residual stress region 50c, 50t in the cover element 50 that spans the central portion 52l' (see FIG. 5, after the "Release" arrow).

Referring again to FIG. 5, the stress state in the cover element 50 is also depicted (right-hand portion of FIG. 5) during the method of developing the flex-bond residual stress region. For purposes of simplicity and explanation of the flex-bond method, the cover element 50 is depicted in FIG. 5 without any additional compressive stress regions (e.g., an ion-exchanged compressive stress region, a CTE-induced compressive stress region, etc.). During the portion of the method before the "Bend then Bond" step depicted in FIG. 5, the cover element 50 of the stacked module is characterized by substantially no compressive or tensile stresses. After this step, the cover element 50 is subjected to "bending" and "curing" steps. During these steps, the cover element 50 is characterized by a relatively uniform stress state (non-residual) that ranges from a maximum tensile stress at the first primary surface 54 (denoted as a positive stress) to a maximum compressive stress at the second primary surface 56 (denoted as a negative stress) at the central bend axis 210 with the central portion 52l' of the cover element 50. Note that, in many embodiments, the residual stresses in the flex-bond residual stress region are largely compressive through the thickness of the cover element away from the center bend axis 210, but within the central portion 52l'. As also shown in the right-hand side of FIG. 5, the stress state in the cover element 50 is such that substantially no compressive or tensile stresses exist at about the mid-point of the thickness 52 of the cover element 50 at the central bend axis 210. Finally, the residual stress state in the cover element 50 is depicted in FIG. 5 (right-hand side, lowermost figure) as it exists after the foldable module is returned or otherwise released back to an un-bent or substantially un-bent configuration. At this point in the flex-bond method, a flex-bond residual stress region 50c, 50t has developed within the central portion 52l' of the cover element 50. In particular, the flex-bond residual stress region includes a compressive residual stress region component 50c with a thickness 52c and a tensile residual stress region component 50t with a thickness 52t. Given the nature of the flexing of the module while it is disposed with an adhesive, curing after the flexing and then the return to an un-bent configuration, the resultant flex-bond residual stress region can be asymmetric within the thickness of the cover element 50 within the central portion 52l'. Accordingly, the point of zero stress within the cover element 50 is generally not at the mid-point of the thickness 52 of the cover element within the central portion 52l'.

In some embodiments, the flex-bond method is conducted such that the foldable electronic module (e.g., modules 100a-c) includes a flex-bond residual stress region. As noted earlier, the flex-bond residual stress region 50c, 50t is through the thickness 52 of the cover element 50 within the central portion 52l' and ranges from a maximum compressive residual stress at the second primary surface 56 to a maximum tensile residual stress at the first primary surface 54 at the central bend axis 210. In certain embodiments, $R_{flex}$ is selected in the step of bending the affixed module (e.g., as staked with first adhesive 10a, but before the adhesive 10a has been cured) within a range of about 5 mm to about 50 mm, of about 5 mm to about 40 mm, of about 5 mm to about 30 mm, of about 5 mm to about 20 mm, of about 5 mm to about 10 mm, of about 10 mm to about 50 mm, of about 10 mm to about 40 mm, of about 10 mm to about 30 mm, of about 10 mm to about 20 mm, of about 20 mm to about 50 mm, of about 20 mm to about 40 mm, of about 20 mm to about 30 mm, of about 30 mm to about 50 mm, of about 30 mm to about 40 mm, or of about 40 mm to about 50 mm.

According to some further embodiments of the method, a flex-bond residual stress region 50c, 50t is formed in the modules 100a-100c after the curing step and upon a return of the module to an un-bent or substantially un-bent configuration such that the maximum compressive residual stress at the second primary surface 56 of the cover element 50 within the central portion 52l' at the central bend axis 210 can reach up to 300 MPa, up to 275 MPa, up to 250 MPa, up to 225 MPa, up to 200 MPa, up to 175 MPa, up to 150 MPa, up to 125 MPa, up to 100 MPa, up to 75 MPa, up to 50 MPa, up to 40 MPa, up to 30 MPa, up to 20 MPa, up to 10 MPa, and all values between these maximum compressive stress levels at the second primary surface of the cover element. The flex-bond residual stress region can be characterized by a residual stress that varies through the thickness 52 of the cover element 50 within the central portion 52l'. In certain aspects, the residual stress continuously varies in a substantially linear function through the thickness of the cover element, e.g., from the maximum compressive residual stress at the second primary surface 56 to the maximum tensile residual stress at the first primary surface 54 of the cover element at the central bend axis 210 (see, e.g., FIG. 5).

Figure 5A:
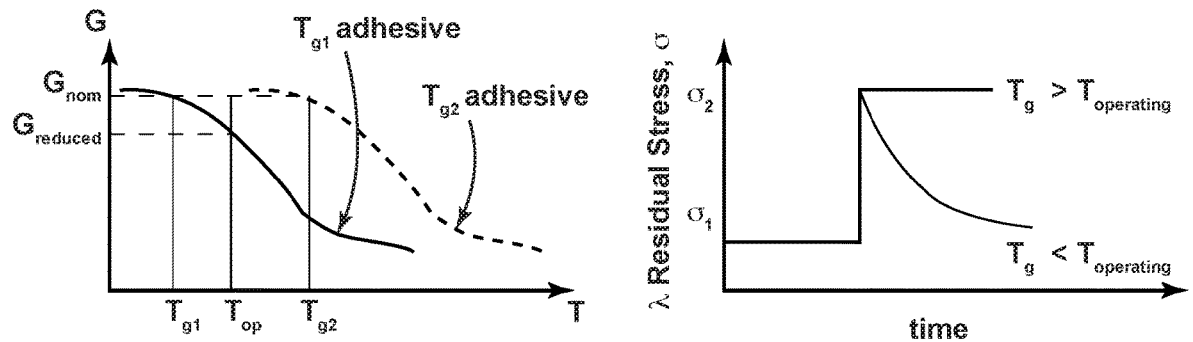
FIG. 5A provides two schematic plots of the shear modulus as a function of temperature and foldable module residual stress as a function of time at an operating temperature for two adhesives with different glass transition temperatures according to an aspect of the disclosure.

Referring to FIG. 5A (left-hand portion), a schematic plot is provided that depicts the shear modulus (Y axis) as a function of temperature (X-axis) for two adhesives (e.g., candidates for first adhesive 10a in a foldable module 100a, 100b, 100c) with different glass transition temperatures ($T_g$), $T_{g1}$ and $T_{g2}$ (i.e., the solid and dashed lines in the left-hand plot in FIG. 5A, respectively). Further, an arbitrary foldable module operating temperature is denoted in FIG. 5 by "$T_{op}$." As this portion of FIG. 5A makes clear, the adhesive with a lower glass transition temperature ($T_{g1}$) exhibits a lower shear modulus ($G_{reduced}$) at the operating temperature ($T_{op}$) compared to the shear modulus ($G_{nom}$) of the adhesive with a higher glass transition temperature ($T_{g2}$) above the operating temperature ($T_{op}$). Moreover, the shear modulus of the adhesive with $T_{g1}$ is below its nominal shear modulus, ($G_{nom}$), at an ambient temperature above the operating temperature ($T_{op}$). A significant reduction in the shear modulus of the adhesive upon exposure to foldable module operating temperatures can lead to stress relaxation within the cover element, effectively reducing the magnitude of residual stresses in the flex-bond residual stress region (or complete elimination of the flex-bond residual stress region).

Referring to FIG. 5A (right-hand portion), a schematic plot is provided that depicts foldable module residual stress (Y axis) as a function of time (X axis) at an operating temperature for two adhesives (e.g., candidates for first adhesive 10a in a foldable module 100a, 100b, 100c) with different glass transition temperatures. In particular, one of the adhesives is characterized by a glass transition temperature that is lower than an operating temperature ($T_g < T_{operating}$) and the other adhesive is characterized by a glass transition temperature that is greater than an operating temperature ($T_g > T_{operating}$). As the right-hand portion of FIG. 5A depicts, the residual stress in the module with lower glass transition temperature decreases after a period of time in which the operating temperature exceed the glass transition temperature ($T_g < T_{operating}$) due to stress relaxation in the adhesive. Conversely, the residual stress in the module with the higher glass transition temperature stays constant after a period of time in which the operating temperature does not exceed the glass transition temperature ($T_g > T_{operating}$). Consequently, the left- and right-hand portions of FIG. 5A demonstrate a beneficial aspect of the development and retention of the flex-bond residual stress region. In particular, the adhesives (e.g., first adhesive 10a) employed in the module should be selected with a relatively high glass transition temperature, preferably above the expected operating temperatures of the foldable module employing the cover element with the flex-bond residual stress region.

Figure 5B:
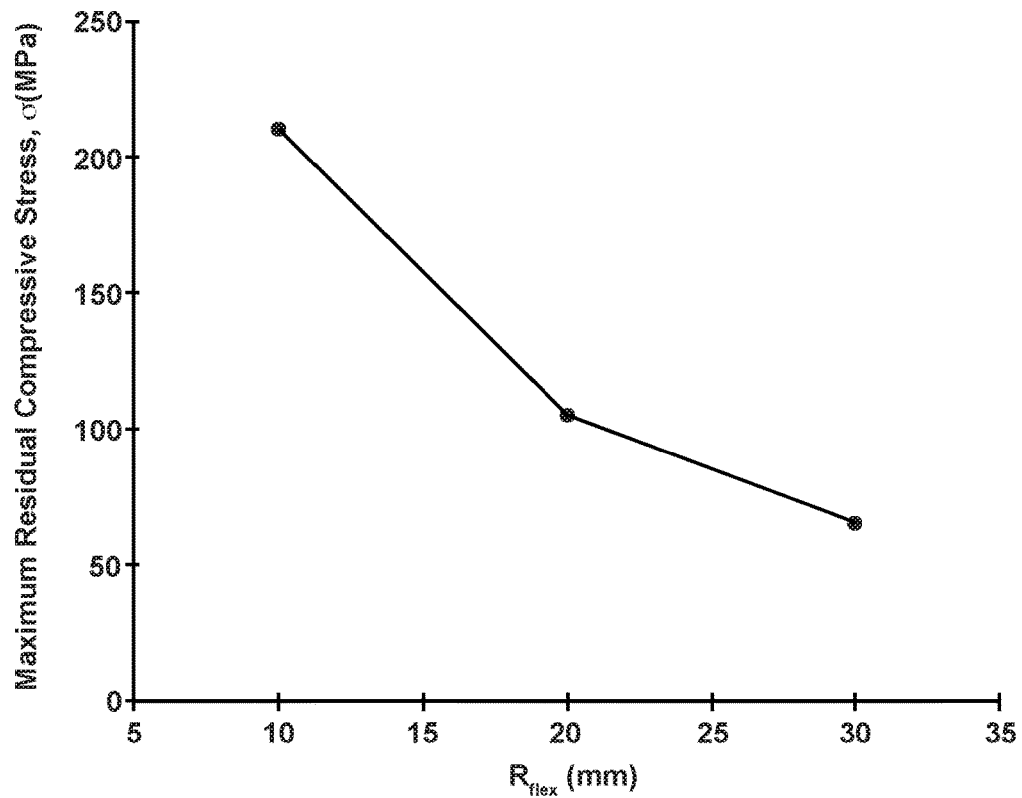
FIG. 5B is a schematic plot of maximum residual compressive stress developed across the thickness of a cover element of a foldable module as a function of the flex radius, $R_{flex}$, employed during a flex-bonding process according to an aspect of the disclosure.

Referring now to FIG. 5B, the effect of flex radius, $R_{flex}$, on the maximum compressive residual stress developed in a flex-bond residual stress region at the central bend axis 210 is demonstrated in schematic form. In particular, FIG. 5B provides a schematic plot of maximum residual compressive stress (MPa) developed in a cover element of a foldable module as a function of the flex radius (mm), $R_{flex}$, employed during a flex-bonding process. As is evident from FIG. 5B, flexing the affixed module to a flex radius, $R_{flex}$, of about 30 mm, followed by curing and returning the module to an un-bent configuration, produces a flex-bond residual stress region with a maximum compressive stress of about 75 MPa at the second primary surface 56 of the cover element 50 at the central bend axis 210. As is also evident from FIG. 5B, flexing the affixed module to a tighter flex radius, $R_{flex}$, of about 10 mm, followed by curing and returning the module to an un-bent configuration, produces a flex-bond residual stress region with a maximum compressive stress of about 210 MPa at the second primary surface 56 of the cover element 50 at the central bend axis 210. Thus, flexing the affixed module (e.g., as stacked with first adhesive 10a, but before the adhesive 10a has been cured) to a tight bend radius approaching, or lower than, 10 mm can significantly increase the amount of residual compressive stress developed at the second primary surface 56 of the cover element 50 to levels that exceed 200 MPa at the central bend axis 210. As outlined earlier, these residual compressive stress levels can serve to offset tensile stresses at the same location upon bending the module away from the second primary surface of the cover element, generally about the central bend axis 210.

Figure 5C:
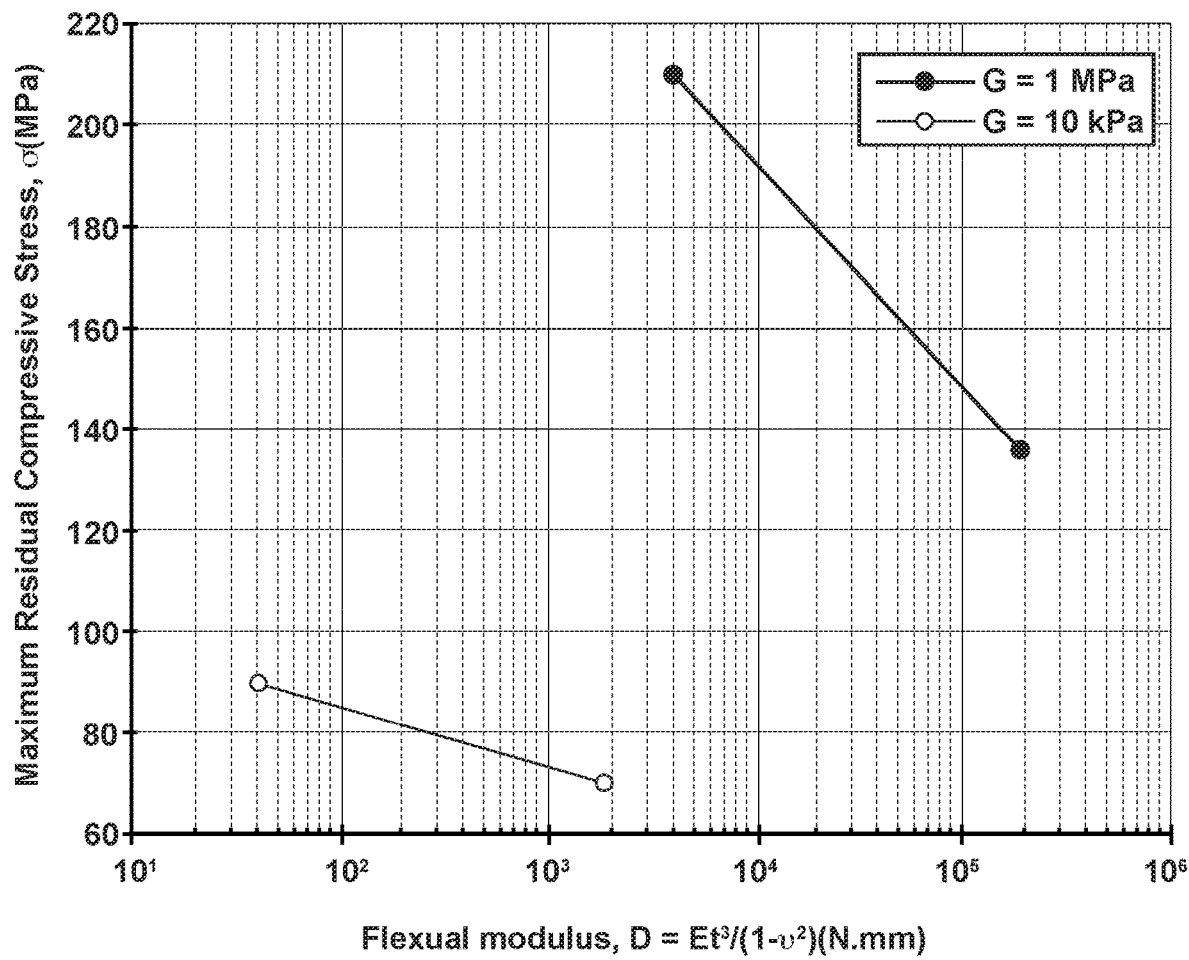
FIG. 5C is a schematic plot of maximum residual compressive stress developed in a cover element of a foldable module as a function of a factor, D, that corresponds to the overall flexural stiffness of the first adhesive according to an aspect of the disclosure.

Turning now to FIG. 5C, a schematic plot of maximum residual compressive stress (MPa) developed in a cover element of a foldable module is provided as a function of a factor, D, that corresponds to the overall flexural modulus of the first adhesive for two adhesives exhibiting a constant shear modulus (G) of 1 MPa and 10 kPa (0.01 MPa), respectively. In FIG. 5C, the flexural modulus factor, D, is equal to $E*t^3/(1-\upsilon^2)$ in which E, t and $\upsilon$ are the elastic modulus, thickness and Poisson's ratio material properties of each of the adhesives, respectively. As FIG. 5C generally depicts, decreasing the flexural modulus factor (D) of a given adhesive while holding shear modulus constant tends to increase the amount of maximum residual compressive stress at the second primary surface of the cover element within the flex-bond residual stress region at the central bend axis 210. In particular, the flexural modulus factor (D) can be reduced by any combination of decreasing the thickness of the adhesive and/or increasing the Poisson's ratio of the adhesive. As FIG. 5C also demonstrates, selecting an adhesive with a higher shear modulus (G) can significantly increase the amount of maximum residual compressive stress in the flex-bond residual stress region at the second primary surface of the cover element. FIG. 5C also highlights the same effect as depicted in the left-hand side of FIG. 5A associated with a loss in shear modulus in the adhesive. That is, a loss in shear modulus (G) through stress relaxation from employing an adhesive with a relatively low glass transition temperature below the expected operating temperature of the foldable module employing the adhesive (i.e., as joined between a cover element and stack) can significantly reduce the maximum residual compressive stress in the flex-bond residual stress region at the second primary surface of the cover element at the central bend axis 210.

Through careful study and analysis of foldable modules comparable in configuration to the foldable modules 100a, 100b and 100c, an understanding of the importance of controlling the material properties and/or thicknesses of the adhesives employed within the modules was also developed. These studies included the development of simple two-layer models based on conventional composite beam theory and equations, with one layer corresponding to the cover element and the other layer corresponding to a stack (e.g., as envisioned to include a panel, electronic devices and other components). In addition, more sophisticated non-linear finite element analysis ("FEA") models (i.e., employing conventional FEA software packages) contributed to aspects of the disclosure. In particular, the FEA models were used to simultaneously assess stresses that could lead to cohesive failures of the cover element, delamination effects, and potential buckling issues within the foldable modules.

Figure 6A:
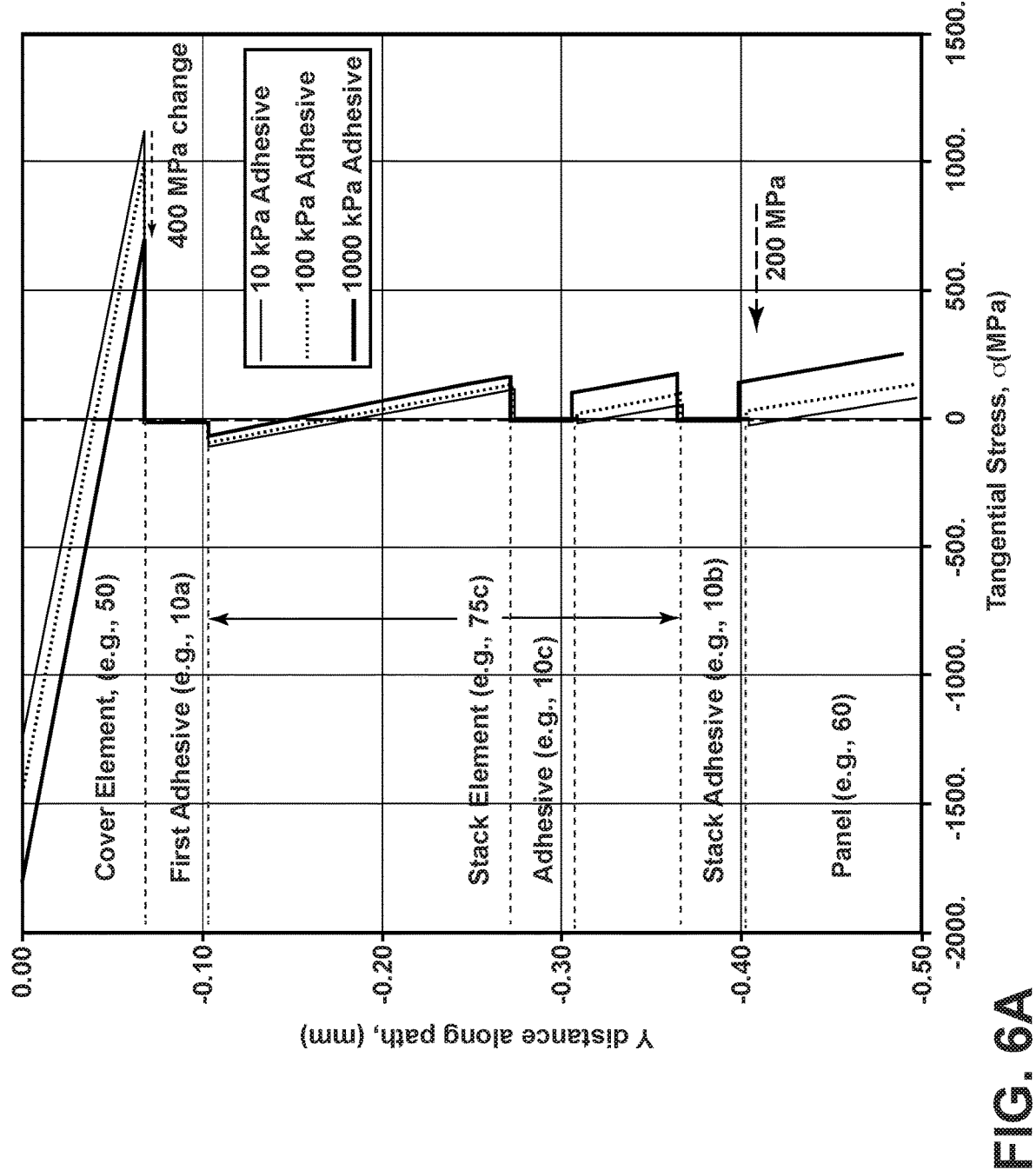
FIG. 6A is a plot of estimated tangential stress as a function of depth through the thickness of three foldable electronic device modules, each containing a first adhesive with a different shear modulus configured to join a cover element to a stack, according to a further aspect of the disclosure.
Figure 6B:
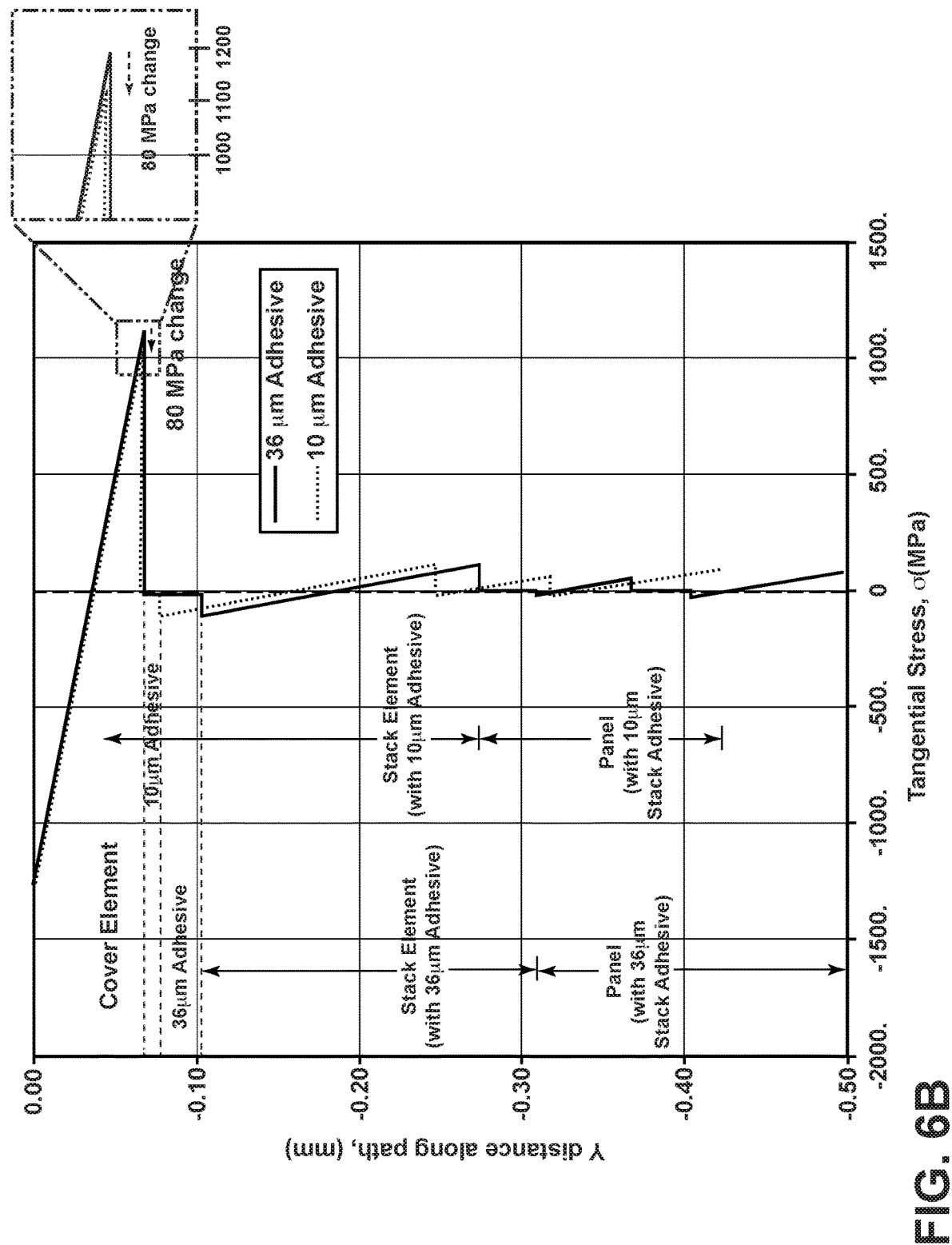
FIG. 6B is a plot of estimated tangential stress as a function of depth through the thickness of two foldable electronic device modules, each containing a first adhesive with a different thickness configured to join a cover element to a stack with a different thickness, according to another aspect of the disclosure.
Figure 7:
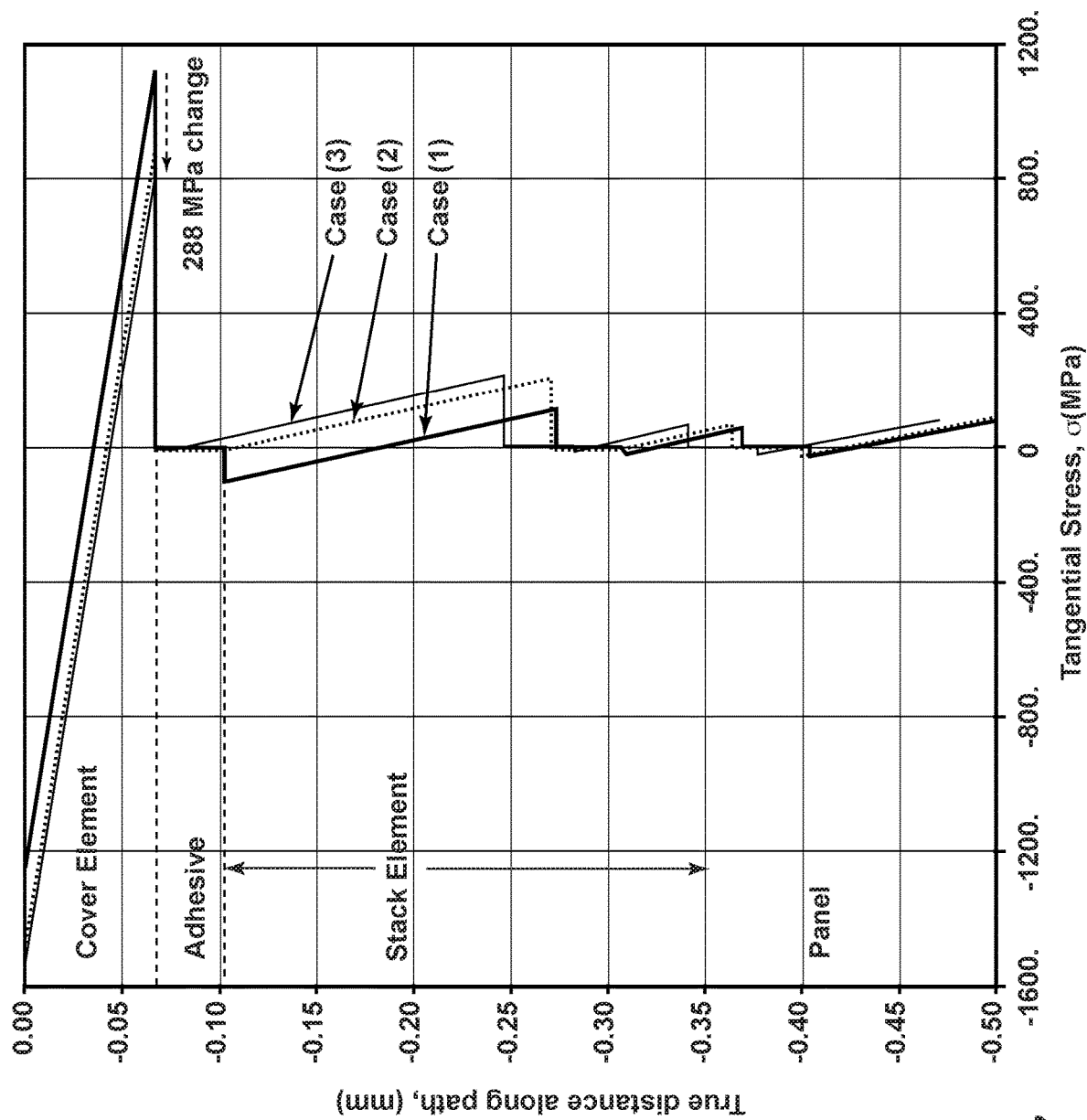
FIG. 7 is a plot of estimated tangential stress as a function of depth through the thickness of three foldable electronic device modules having different adhesive configurations, according to a further aspect of the disclosure.

The output of these non-linear FEA models included the plots depicted in FIGS. 6A, 6B and 7. Each of these figures includes a plot of estimated tangential stress (MPa, X axis) as a function of depth (mm, Y axis) through the thickness of foldable electronic device modules comparable in design to the modules contained in the disclosure, e.g., modules 100a-c. As shown, zero depth is at the first primary surface of the cover element 50, and depth numbers decrease through the cover element and stack. The foldable electronic device modules were subjected to a bend radius of 3 mm (e.g., bend radius 220, as shown in FIG. 4B) within the FEA model. Table 1 below provides a listing of elements employed in the FEA model, including assumed material properties for each of them. Further, the FEA model was conducted with the following additional assumptions: (a) the entire module was assumed to have a non-linear geometric response; (b) the adhesives were assumed to be incompressible, hyper-elastic materials; (c) the cover elements and other non-adhesive features in the model were assumed to have elastic material properties; and (d) the bending was conducted at room temperature.

TABLE ONE

| Element | Thickness (μm) | Elastic modulus, E (GPa) | Poisson's ratio, $\upsilon$ |
| --- | --- | --- | --- |
| Glass cover element | 67 | 71 | 0.22 |
| Touch sensor - PET | 170 | 2.8 | 0.37 |
| Polarizer - PET | 60 | 2.8 | 0.37 |
| Panel - polyimide | 95 | 2.5 | 0.34 |
| Adhesive | Variable (10 to 36) | Variable (shear modulus) | 0.499 |

Referring to FIG. 6A, a plot of estimated tangential stress as a function of depth through the thickness of three foldable electronic device modules is provided. In this plot, each of the three bendable modules contains adhesives (e.g., comparable to first adhesive 10a and stack adhesive 10b employed in the bendable module 100c shown in FIG. 3) configured to join a cover element to a stack, and a stack to a panel, each with a different shear modulus, 10 kPa, 100 kPa and 1000 kPa, respectively. In particular, each of the adhesives employed in a given module was assumed to possess the same shear modulus, 10 kPa, 100 kPa or 1000 kPa. As the plot makes clear, the tangential stresses observed at the interface between the cover element and the first adhesive (e.g., at the second primary surface 56 of the cover element 50) are reduced by about 400 MPa (in tension) with an increase in the shear modulus of the adhesives contained in the module from 10 kPa to 1000 kPa. That is, FIG. 6A demonstrates that increasing the shear modulus of all of the adhesives within a given bendable electronic device module can beneficially reduce the tensile stresses at the second primary surface of the cover element.

Also referring to FIG. 6A, the tensile stresses observed at the interface between the panel and an adhesive joining the panel to a stack element (e.g., stack adhesive 10b employed in the foldable module 100c shown in FIG. 3) are reduced by about 200 MPa with a decrease in the shear modulus of the adhesives contained in the module from 1000 kPa to 10 kPa. That is, FIG. 6A demonstrates that decreasing the shear modulus of all of the adhesives within a given bendable electronic device module can beneficially reduce the tensile stresses at the first primary surface of the panel employed in the device module.

Referring to FIG. 6B, a plot of estimated tangential stress as a function of depth through the thickness of two foldable electronic device modules is provided. In this plot, each of the bendable modules contain adhesives (e.g., comparable to first adhesive 10a and stack adhesive 10b employed in the bendable module 100c shown in FIG. 3) configured to join a cover element to a stack, and to join a stack to a panel, with a shear modulus of 10 kPa. In one of the modules, the thickness of each of the adhesives employed in the module was set at 10 µm. In the other module, the thickness of each of the adhesives employed in the module was set at 36 µm. As the plot makes clear, the tensile stresses observed at the interface between the cover element and the first adhesive (e.g., at the second primary surface 56 of the cover element 50) are reduced by about 80 MPa with a decrease in the thickness of the adhesives contained in the module from 36 µm to 10 µm. That is, FIG. 6B demonstrates that decreasing the thickness of all of the adhesives within a given bendable electronic device module can beneficially reduce the tensile stresses at the second primary surface of the cover element.

Referring to FIG. 7, a plot of estimated tangential stress as a function of depth through the thickness of three foldable electronic device modules is provided. In this plot, "Case (1)" corresponds to a bendable module with all of its adhesives exhibiting a shear modulus of 10 kPa and having a thickness of 36 µm. "Case (2)" corresponds to a bendable module with the same configuration as Case (1), except that the shear modulus of the adhesive adjacent to the cover element was increased to 1000 kPa. "Case (3)" corresponds to a bendable module with the same configuration as Case (2), except that the thickness of the adhesive adjacent to the cover element is reduced to 12 µm. As the plot makes clear, the tensile stresses observed at the interface between the cover element and the first adhesive (e.g., at the second primary surface 56 of the cover element 50) are reduced by about 240 MPa with an increase in the shear modulus of the first adhesive adjacent to the cover element from 10 kPa to 1000 kPa (i.e., from Case (1) to Case (2)). Further, another 48 MPa reduction in tensile stress is observed with a decrease in the thickness of the first adhesive adjacent to the cover element from 36 µm to 12 µm (i.e., from Case (2) to Case (3)). That is, FIG. 7 demonstrates that decreasing the thickness and increasing the shear modulus of the adhesive joining the cover element to the stack within a given bendable electronic device module can beneficially reduce the tensile stresses at the second primary surface of the cover element.

Figure 8:
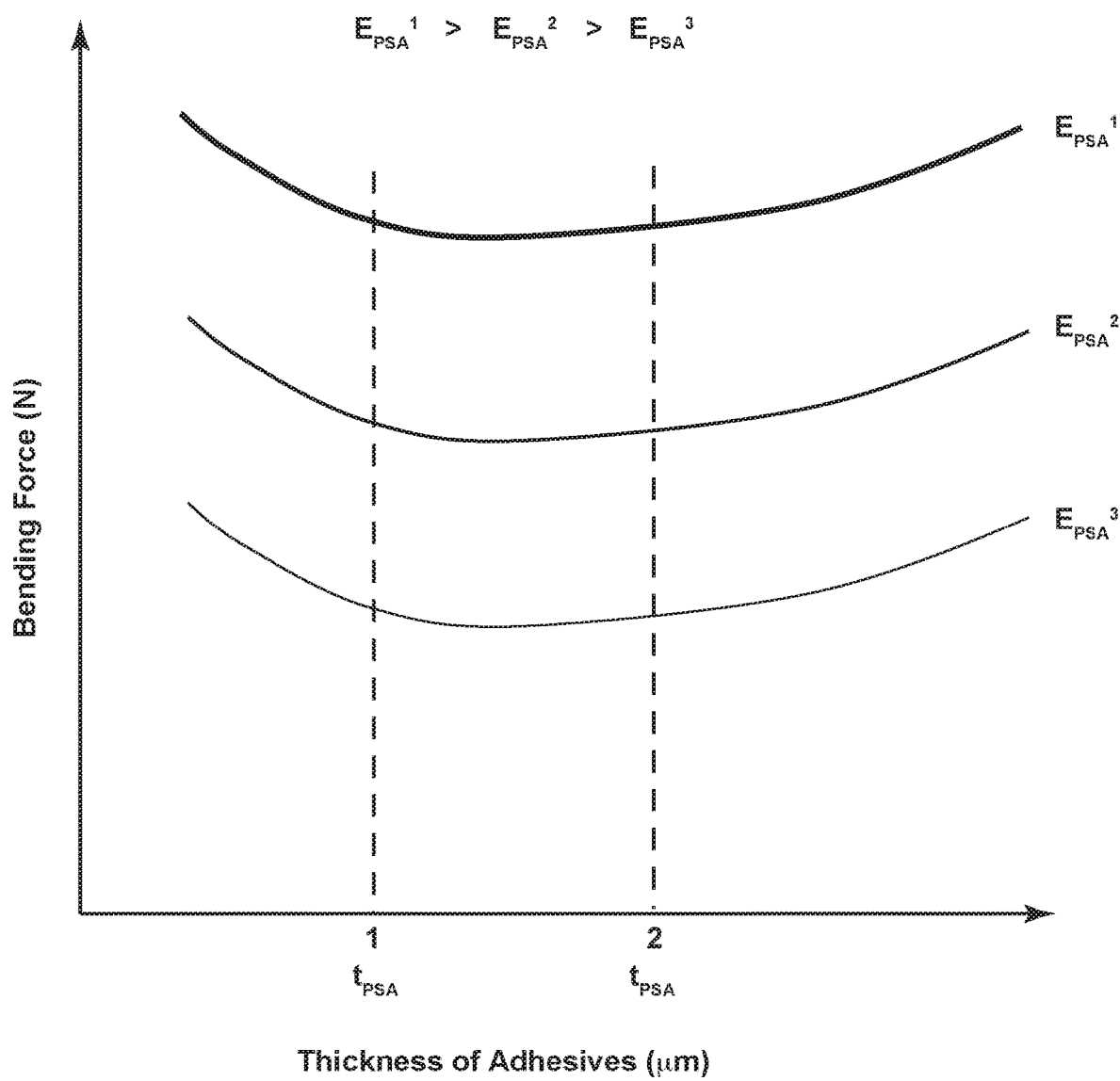
FIG. 8 is a schematic plot of estimated bending force as a function of adhesive thickness for three foldable electronic device modules, each configured with adhesives having a distinct shear modulus, according to a further aspect of the disclosure.

Referring to FIG. 8, a schematic plot of estimated bending force (N) as a function of adhesive thickness (µm) is provided for three foldable electronic device modules configured in an arrangement comparable to modules 100c. More particularly, each of the three modules is configured with three adhesives (e.g., a first adhesive 10a, a stack adhesive 10b and an adhesive 10c). Further, the three adhesives in each of the modules all have a single, distinct shear modulus; consequently, the adhesives in the first module have a shear modulus of "$E_{PSA}^1$," the adhesives in the second module have a shear modulus of "$E_{PSA}^2$" and the adhesives in the third module have a shear modulus of "$E_{PSA}^3$." As shown in FIG. 8, $E_{PSA}^1 > E_{PSA}^2 > E_{PSA}^3$. It is evident from FIG. 8 that a reduction in the shear modulus of the adhesives employed in these foldable electronic device modules results in a significant decrease in the bending forces required to fold or otherwise bend these modules (e.g., as in a two-point test configuration depicted in FIGS. 4A & 4B). It is also apparent from FIG. 8 that suitable reductions in bending forces (N) occur for these electronic device modules for a certain range of thicknesses, i.e., between "$t_{PSA}^1$" and "$t_{PSA}^2$." Some aspects of the electronic device modules exhibit their lowest bending forces in a thickness range from about 10 µm to about 30 µm, corresponding to respective $t_{PSA}^1$ and $t_{PSA}^2$ thicknesses, as depicted in FIG. 8. In contrast, adhesive thicknesses (µm) greater than $t_{PSA}^2$ and thicknesses lower than $t_{PSA}^1$ tend to result in increasing bending forces.

Figure 9A:
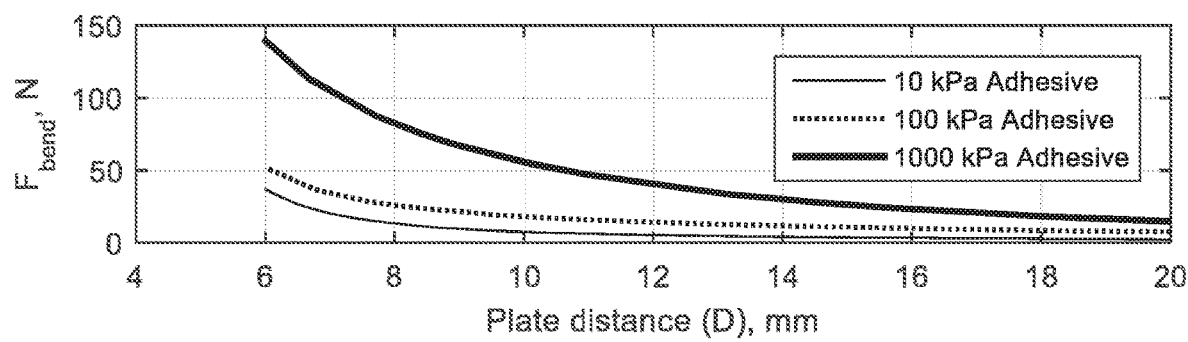
FIGS. 9A-9C are plots of estimated bending force as a function of plate distance in a two-point test apparatus for the foldable electronic device modules depicted in FIGS. 5A, 5B and 6, respectively, according to another aspect of the disclosure.

Referring to FIG. 9A, a plot of estimated bending force, $F_{bend}$ (N), as a function of plate distance, D (mm), in a two-point test apparatus is provided for the foldable electronic device modules depicted in FIG. 6A. That is, each of the three bendable modules depicted in FIG. 9A contains adhesives (e.g., comparable to first adhesive 10a, stack adhesive 10b and adhesive 10c employed in the bendable module 100c shown in FIG. 3) configured to join a cover element to a stack, and a stack to a panel, each module with a different shear modulus, 10 kPa, 100 kPa and 1000 kPa, respectively. In particular, each of the adhesives employed in a given module was assumed to possess the same shear modulus, either 10 kPa, 100 kPa or 1000 kPa. As shown in FIG. 9A, the bending force for a module as a function of plate distance is sensitive to the shear modulus of the adhesives employed within the module. For example, at a plate distance of 6 mm (i.e., bend radius of about 3 mm), the device module with adhesives exhibiting a shear modulus of 1000 kPa experienced a bending force of about 140 N and the device module with adhesives exhibiting a shear modulus of 10 kPa experienced a bending force of about 30N. Accordingly, foldable electronic device modules can be designed to reduce bending forces by employing adhesives with a relatively low shear modulus. Depending on the application for the module, however, any reduction in bending force through control of adhesive shear modulus can be offset or otherwise balanced in view of the decreases in tangential stress between the cover element and first adhesive that can be obtained through increasing the shear modulus of the adhesives within the module, as outlined earlier in connection with FIG. 6A.

Figure 9B:
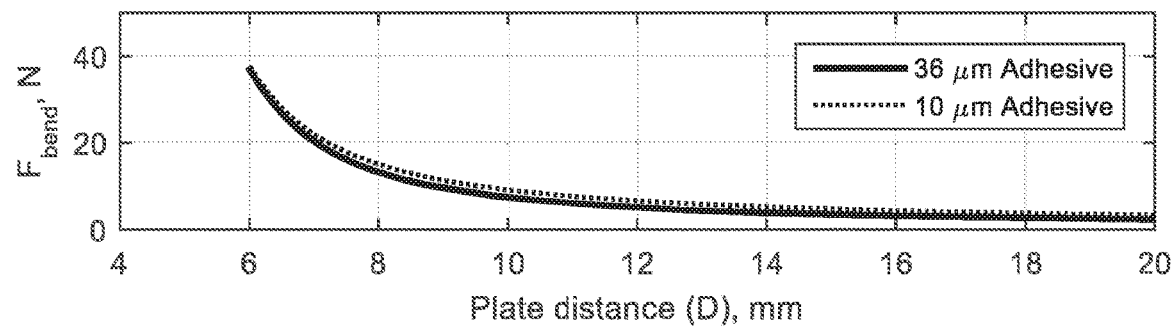

Referring to FIG. 9B, a plot of estimated bending force, $F_{bend}$ (N), as a function of plate distance, D (mm), in a two-point test apparatus is provided for the two foldable electronic device modules depicted in FIG. 6B. That is, each of the bendable modules contain adhesives (e.g., comparable to first adhesive 10a, stack adhesive 10b and adhesive 10c employed in the bendable module 100c shown in FIG. 3) configured to join a cover element to a stack, and to join a stack to a panel, with a shear modulus of 10 kPa. In one of the modules, the thickness of each of the adhesives employed in the module was set at 10 µm. In the other module, the thickness of each of the adhesives employed in the module was set at 36 µm. As shown in FIG. 9B, the bending force for a module as a function of plate distance is fairly insensitive to the thickness of the adhesives employed within the module when the thickness is between about 10 µm and about 36 µm. For example, at a plate distance of 6 mm (i.e., bend radius of about 3 mm), both device modules experienced about the same bending force, between about 35 N and about 40 N. Nevertheless, it is also evident from FIG. 8 that adhesive thickness levels farther above 36 µm and below 10 µm can lead to increasing amounts of bending forces experienced by the modules.

Figure 9C:
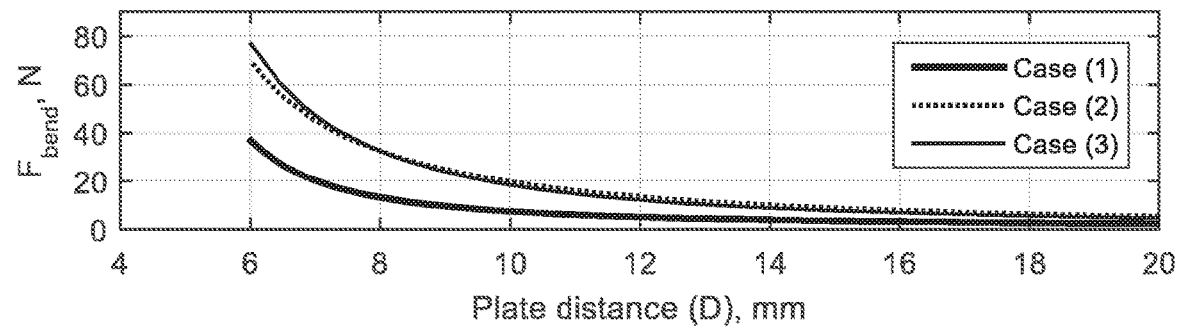

Referring to FIG. 9C, a plot of estimated bending force, $F_{bend}$ (N), as a function of plate distance, D (mm), in a two-point test apparatus for the three foldable electronic device modules depicted in FIG. 7. As noted earlier, "Case (1)" corresponds to a bendable module with all of its adhesives exhibiting a shear modulus of 10 kPa and having a thickness of 36 µm. "Case (2)" corresponds to a bendable module with the same configuration as Case (1), except that the shear modulus of the adhesive adjacent to the cover element was increased to 1000 kPa. Hence, in Case (2) the shear modulus values of the other adhesives in the module not adjacent to the cover element are set at 10 kPa. "Case (3)" corresponds to a bendable module with the same configuration as Case (2), except that the thickness of the adhesive adjacent to the cover element is reduced to 12 µm. That is, in Case (3) the thicknesses of the other adhesives in the module not adjacent to the cover element are set at 36 µm and a shear modulus of 10 kPa, whereas the adhesive adjacent to the cover element had a shear modulus of 1000 kPa, and a thickness of 12 µm.

As shown in FIG. 9C, the bending force for a plate distance of 6 mm is at a minimum for Case (1) at about 40 N, which corresponds to an electronic module with all of its adhesives having a thickness of 36 µm and a shear modulus of 10 kPa. For the Case (3) condition, however, a modest increase in bending force of about 40 N is realized by adjusting the thickness and shear modulus of the first adhesive (i.e., without any change to the shear modulus or thickness of the other adhesives in the module) to 12 µm and 1000 kPa, respectively. The Case (3) condition with a modest increase of about 40 N in the bending force stands in contrast to the approximate 110 N increase in bending force that results from increasing the shear modulus of all of the adhesives in the module as shown in FIG. 9A. Moreover, as demonstrated earlier in FIG. 7, the Case (3) condition is particularly advantageous in providing a 288 MPa reduction in tangential stress between the glass cover element and the first adhesive. Hence, a significant decrease in tangential stress can be realized in the module by increasing the shear modulus and reducing the thickness of the first adhesive, i.e., the adhesive adjacent to the glass cover element, with only modest increases to the bending force.

Advantageously, the foldable electronic device modules in the disclosure are configured and processed for high mechanical reliability and puncture resistance. In particular, these foldable modules exhibit reduced tangential stresses (in tension) at primary surfaces of the cover element and/or panel through development of compressive stress region(s) (i.e., as including one or more of a flex-bond residual stress region, an ion-exchanged compressive stress region, and CTE-induced compressive stress region), control of the material properties and/or thicknesses of the adhesives employed in the modules. These lower tensile stresses, particularly at surfaces and particular locations of the cover element that experience the high tensile stresses during application-related bending and flexing of the module containing the cover element, translate into better reliability and/or smaller bend radius capability for the module. Moreover, these lower tensile stresses can provide an improved design margin for electronic devices employing these foldable modules. In view of the reductions of tensile stress in the foldable modules associated with various aspects of the disclosure, the compressive stress regions and/or other strength-enhancing measures that produce high, residual compressive stresses in the cover element can be reduced in certain cases. Accordingly, compressive stress region-related processing costs associated with the cover element can be reduced in view of some of the concepts set forth in the disclosure. Further, the beneficial effects of reducing the thickness of the first adhesive in these bendable modules in terms of tensile stress reductions can additionally provide an overall reduction in the thickness of the module. Such module thickness reductions can be advantageous for many end product applications for these modules having a low profile.

Also advantageously, the foldable electronic device modules in the disclosure can be configured to minimize the bending forces required of the user to bend or otherwise fold the module. In particular, bending forces experienced by these modules can be reduced by decreasing the shear modulus and/or choosing an appropriate thickness of the adhesives employed in the module. Further, certain exemplary foldable electronic device modules can be designed for mechanical reliability, puncture resistance and bend force reductions by utilizing a relatively high shear modulus adhesive at the glass cover element and relatively low shear modulus adhesives in other locations within the module.

It will be apparent to those skilled in the art that various modifications and variations can be made to the foldable electronic device modules of the disclosure without departing from the spirit or scope of the claims.

What is claimed is:
1. A foldable electronic device module, comprising:
a glass cover element with first and second primary surfaces, the cover element having a thickness from about 25 µm to about 200 µm and a cover element elastic modulus from about 20 GPa to about 140 GPa, measured at room temperature;
a stack having a thickness from about 50 µm to about 600 µm, the stack further comprising a panel having first and second primary surfaces, and a panel elastic modulus between about 300 MPa and about 10 GPa, measured at room temperature; and
a first adhesive joining the stack to the second primary surface of the cover element, the first adhesive having a shear modulus between about 0.01 MPa and about 1 GPa and a glass transition temperature of at least 80° C.,
wherein the device module comprises a tangential stress at the second primary surface of the cover element of no greater than about 1000 MPa in tension upon bending the module in a two-point configuration to a bend radius from about 20 mm to about 1 mm such that the first primary surface is in compression and the bend radius is measured from a center point above the first primary surface of the cover element to the second primary surface of the panel.

2. The module of claim 1, wherein the tangential stress is no greater than 800 MPa in tension upon bending the module in a two-point configuration to a bend radius from about 20 mm to about 2 mm such that the first primary surface is in compression and the bend radius is measured from a center point above the first primary surface of the cover element to the second primary surface of the panel.

3. A foldable electronic device module, comprising:
a glass cover element with first and second primary surfaces, the cover element having a thickness from about 25 µm to about 200 µm and a cover element elastic modulus from about 20 GPa to about 140 GPa, measured at room temperature;
a stack having a thickness from about 50 µm to about 600 µm, the stack further comprising a panel having first and second primary surfaces, and a panel elastic modulus between about 300 MPa and about 10 GPa, measured at room temperature;
a first adhesive joining the stack to the second primary surface of the cover element, the first adhesive having a shear modulus between about 0.01 MPa and about 1 GPa and a glass transition temperature of at least 80° C.; and
a flex-bond residual stress region,
wherein the residual stress region is through the thickness, and within a central region, of the cover element and ranges from a maximum compressive residual stress at the second primary surface to a maximum tensile residual stress at the first primary surface along a central bend axis of the cover element through the thickness of the cover element.

4. The module of claim 1, wherein the tangential stress at the second primary surface of the cover element is no greater than about 600 MPa in tension.

5. The module of claim 1, wherein the cover element is further characterized by no cohesive failures upon bending the module, in a two-point configuration, from a substantially un-bent configuration to the bend radius for at least 300,000 bend cycles.

6. The module of claim 1, wherein the cover element is a glass element having a cover element elastic modulus from about 50 GPa to about 100 GPa.

7. The module of claim 1, wherein the first adhesive is further characterized by a glass transition temperature of at least 150° C.

8. The module of claim 3, wherein the maximum compressive residual stress at the second primary surface of the cover element is at least 100 MPa.

9. The module of claim 3, wherein the maximum compressive residual stress at the second primary surface of the cover element is at least 200 MPa.

10. The module of claim 8, further comprising:
an ion-exchanged compressive stress region that extends from a second primary surface of the cover element to a selected depth, the ion-exchanged compressive stress region comprising a plurality of ion-exchangeable ions and a plurality of ion-exchanged ions.

11. The module of claim 10, wherein the ion exchanged compressive stress region comprises a maximum compressive stress of 700 MPa or greater at the second primary surface of the cover element.

12. The module of claim 11, wherein the device module is further characterized by a tangential stress at the second primary surface of the cover element of no greater than about 900 MPa in tension upon bending the module in a two-point configuration to a bend radius from about 20 mm to about 2 mm such that the first primary surface is in compression and the bend radius is measured from a center point above the first primary surface of the cover element to the second primary surface of the panel.

13. The module of claim 3, wherein the residual stress region comprises a residual stress that varies through the thickness of the cover element.

14. The module of claim 13, wherein the residual stress continuously varies in a substantially linear function through the thickness of the cover element.

15. (Withdrawn / Currently Amended) A method of making a foldable electronic device module, comprising:
disposing a cover element adjacent to a stack with a first adhesive therebetween to define a stacked module, wherein: (a) the cover element comprises a thickness from about 25 μm to about 200 μm, a cover element elastic modulus from about 20 GPa to about 140 GPa measured at room temperature, a glass composition and first and second primary surfaces, (b) the stack comprises a thickness from about 100 μm to about 600 μm and a panel having first and second primary surfaces and a panel elastic modulus between about 300 MPa and about 10 GPa measured at room temperature, (c) the first adhesive is characterized by a shear modulus between about 0.01 MPa and about 1 GPa and a glass transition temperature of at least 80° C., and (d) the second primary surface of the cover element is adjacent to the first adhesive;
bending the stacked module to a flex radius, $R_{flex}$, to define a flexed module, wherein $R_{flex}$ is measured from above the stack to the second primary surface of the cover element;
curing the first adhesive in the flexed module at the flex radius, $R_{flex}$, to define a flex-bonded module; and
returning the flex-bonded module to an un-bent configuration to define the foldable electronic device module.

16. The method of claim 15, wherein the foldable electronic device module comprises a tangential stress at the second primary surface of the cover element of no greater than about 800 MPa in tension upon bending the module in a two-point configuration to a bend radius from about 20 mm to about 2 mm such that the first primary surface is in compression and the bend radius is measured from a center point above the first primary surface of the cover element to the second primary surface of the panel.

17. The method of claim 15, wherein the foldable electronic device module comprises a tangential stress at the second primary surface of the cover element of no greater than about 1000 MPa in tension upon bending the module in a two-point configuration to a bend radius from about 20 mm to about 1 mm such that the first primary surface is in compression and the bend radius is measured from a center point above the first primary surface of the cover element to the second primary surface of the panel.

18. The method of claim 15, wherein the foldable electronic device module further comprises a flex-bond residual stress region, wherein the residual stress region is through the thickness, and within a central region, of the cover element and ranges from a maximum compressive residual stress at the second primary surface to a maximum tensile residual stress at the first primary surface along a central bend axis of the cover element.

19. The method of claim 18, wherein $R_{flex}$ is selected in the bending step within a range from about 5 mm to about 40 mm.

20. The method of claim 18, wherein $R_{flex}$ is selected in the bending step within a range from about 10 mm to about 20 mm.

21. The method of claim 19, wherein the maximum compressive residual stress at the second primary surface of the cover element is at least 50 MPa.

22. The method of claim 20, wherein the maximum compressive residual stress at the second primary surface of the cover element is at least 200 MPa.

* * * * *

UNITED STATES PATENT AND TRADEMARK OFFICE
CERTIFICATE OF CORRECTION

PATENT NO. : 11,104,601 B2
APPLICATION NO. : 16/085759
DATED : August 31, 2021
INVENTOR(S) : Guangli Hu et al.

It is certified that error appears in the above-identified patent and that said Letters Patent is hereby corrected as shown below:

On the Title Page

In Column 2, item (57), Abstract, Line 9, delete "80 C." and insert -- 80° C. --, therefor.

In the Claims

In Column 45, Line 29, Claim 11, delete "ion exchanged" and insert -- ion-exchanged --, therefor.

In Column 45, Line 48, Claim 15, before "A method of" delete "(Withdrawn / Currently Amended)".

Signed and Sealed this
Nineteenth Day of April, 2022

Katherine Kelly Vidal
*Director of the United States Patent and Trademark Office*